US011946299B2

(12) United States Patent
Geraci

(10) Patent No.: US 11,946,299 B2
(45) Date of Patent: Apr. 2, 2024

(54) SIDE LATCH EXIT DEVICE

(71) Applicant: Sargent Manufacturing Company, New Haven, CT (US)

(72) Inventor: Andrew S. Geraci, Durham, CT (US)

(73) Assignee: Sargent Manufacturing Company, New Haven, CT (US)

(*) Notice: Subject to any disclaimer, the term of this patent is extended or adjusted under 35 U.S.C. 154(b) by 0 days.

(21) Appl. No.: 17/459,736

(22) Filed: Aug. 27, 2021

(65) Prior Publication Data

US 2021/0388648 A1 Dec. 16, 2021

Related U.S. Application Data

(63) Continuation-in-part of application No. 16/718,349, filed on Dec. 18, 2019, now Pat. No. 11,377,887.

(Continued)

(51) Int. Cl.
*E05C 9/04* (2006.01)
*E05B 63/20* (2006.01)
(Continued)

(52) U.S. Cl.
CPC ................ *E05C 9/04* (2013.01); *E05B 63/20* (2013.01); *E05C 9/041* (2013.01); *E05C 9/22* (2013.01);
(Continued)

(58) Field of Classification Search
CPC ............. Y10T 292/0829; Y10T 292/08; Y10T 292/0801; Y10T 292/092; Y10T 292/0822; Y10T 292/0825; Y10T 292/0826; Y10T 292/0828; Y10T 292/0832; Y10T 292/0834; Y10T 292/0836; Y10T 292/0838; Y10T 292/0845;
(Continued)

(56) References Cited

U.S. PATENT DOCUMENTS

| | | | |
|---|---|---|---|
| 938,526 | A | 11/1909 | Voight |
| 1,247,052 | A | 11/1917 | Wilson |

(Continued)

FOREIGN PATENT DOCUMENTS

| | | | | | |
|---|---|---|---|---|---|
| CA | 2487694 | A1 * | 5/2005 | ............. | E05B 59/00 |
| CH | 408693 | A * | 2/1963 | ............... | E05C 9/20 |

(Continued)

OTHER PUBLICATIONS

*U.S. Appl. No. 16/185,386, filed Nov. 9, 2018, Palmieri et al.

(Continued)

*Primary Examiner* — Kristina R Fulton
*Assistant Examiner* — Steven A Tullia
(74) *Attorney, Agent, or Firm* — Wolf, Greenfield & Sacks, P.C.

(57) ABSTRACT

A latching device for a door includes an actuator, a first rod, a second rod, a transom latch, and a side latch having a hook latch head. The actuator may include a rod holder including a lockout configured to inhibit disengagement of a rod from the rod holder. The side latch may be a mortise latch which may include a channel configured to receive a nut for alignment during installation. When installed in an associated door, the latching device may withstand multiple impacts from windborne objects or pressures induced by high winds.

30 Claims, 20 Drawing Sheets

Related U.S. Application Data

(60) Provisional application No. 62/783,487, filed on Dec. 21, 2018.

(51) Int. Cl.
*E05C 9/22* (2006.01)
*E05C 19/12* (2006.01)

(52) U.S. Cl.
CPC ......... *E05C 19/12* (2013.01); *E05Y 2900/132* (2013.01)

(58) Field of Classification Search
CPC ......... Y10T 292/0908; Y10T 292/0909; Y10T 292/091; E05C 9/04; E05C 9/041; E05C 9/22; E05C 19/12; E05C 9/00; E05C 9/043; E05C 9/046; E05C 9/048; E05C 9/10; E05C 9/12; E05C 9/16; E05C 9/20; E05B 63/20; E05B 63/0056; E05B 63/06; E05B 63/18; E05B 63/202; E05B 65/10; E05B 65/1006; E05B 65/1013; E05B 65/1046; E05B 65/1053; E05B 79/12; E05B 79/14; E05B 79/16; E05Y 2900/132; Y10S 292/53; Y10S 292/54; Y10S 292/60
See application file for complete search history.

(56) References Cited

U.S. PATENT DOCUMENTS

| | | | | | |
|---|---|---|---|---|---|
| 1,324,181 | A | | 12/1919 | Smith | |
| 1,408,629 | A | | 3/1922 | Palmer | |
| RE15,619 | E | | 6/1923 | Massoll | |
| 1,504,176 | A | * | 8/1924 | Wright | E05C 9/04 70/120 |
| 2,710,216 | A | | 6/1955 | Eichacker | |
| 2,787,154 | A | | 4/1957 | Wesberry | |
| 3,123,387 | A | * | 3/1964 | Jackson et al. | E05B 63/20 292/2 |
| 3,245,237 | A | | 4/1966 | Eads et al. | |
| 3,398,484 | A | * | 8/1968 | Katsumura | E05F 15/622 49/281 |
| 3,563,585 | A | * | 2/1971 | Welch | E05B 65/1066 292/234 |
| 3,771,339 | A | | 11/1973 | Smith | |
| 3,788,687 | A | * | 1/1974 | Zawadzki | E05B 63/20 292/92 |
| 3,953,061 | A | | 4/1976 | Hansen et al. | |
| 4,005,886 | A | | 2/1977 | Lirette | |
| 4,101,153 | A | | 7/1978 | Dozier | |
| 4,114,317 | A | | 9/1978 | Crawley | |
| 4,427,223 | A | | 1/1984 | Godec et al. | |
| 4,643,005 | A | | 2/1987 | Logas | |
| 4,708,378 | A | * | 11/1987 | Ingenhoven | E05B 81/25 292/DIG. 3 |
| 4,741,563 | A | | 5/1988 | Cohrs | |
| 4,978,155 | A | * | 12/1990 | Kobayashi | F16D 43/16 292/201 |
| 5,079,964 | A | * | 1/1992 | Hamada | E05B 81/25 292/201 |
| 5,149,156 | A | * | 9/1992 | Kleefeldt | E05B 81/40 292/201 |
| 5,358,274 | A | * | 10/1994 | Watanabe | B60R 22/201 280/808 |
| 5,373,752 | A | * | 12/1994 | Schlagwein | F16H 25/20 292/201 |
| 5,509,703 | A | | 4/1996 | Lau et al. | |
| 5,531,492 | A | * | 7/1996 | Raskevicius | E05B 63/20 292/335 |
| 5,622,397 | A | | 4/1997 | Rice et al. | |
| 5,722,704 | A | | 3/1998 | Chaput et al. | |
| 5,746,459 | A | * | 5/1998 | Giroux, Jr. | E05B 81/22 292/341.16 |
| 6,000,733 | A | | 12/1999 | Linder | |
| 6,119,538 | A | * | 9/2000 | Chang | E05B 81/25 74/411 |
| 6,152,498 | A | | 11/2000 | Lindqvist | |
| 6,282,929 | B1 | | 9/2001 | Eller et al. | |
| 6,375,244 | B1 | | 4/2002 | Smeltzer | |
| 6,560,925 | B1 | | 5/2003 | Rice | |
| 6,641,183 | B2 | * | 11/2003 | Brown | E05B 65/1013 70/92 |
| 7,712,799 | B2 | | 5/2010 | Peng | |
| 7,770,944 | B2 | * | 8/2010 | Yuan | E05B 47/06 292/195 |
| 7,963,573 | B2 | | 6/2011 | Blomqvist | |
| 8,267,440 | B2 | | 9/2012 | Shen | |
| 8,628,125 | B2 | | 1/2014 | Huang et al. | |
| 8,752,871 | B2 | * | 6/2014 | Rechberg | E05B 15/0205 292/341.18 |
| 9,441,410 | B1 | | 9/2016 | Zorzi et al. | |
| 9,822,552 | B2 | * | 11/2017 | Eller | E05B 47/026 |
| 9,915,084 | B1 | | 3/2018 | Smith et al. | |
| 10,094,142 | B2 | * | 10/2018 | Kondi | E05B 63/06 |
| 10,465,425 | B2 | * | 11/2019 | Clark | E05B 81/25 |
| 11,377,887 | B2 | | 7/2022 | Cote et al. | |
| 2003/0057714 | A1 | | 3/2003 | Brown | |
| 2003/0159477 | A1 | | 8/2003 | Hoffmann et al. | |
| 2004/0227352 | A1 | | 11/2004 | Lin | |
| 2009/0134634 | A1 | | 5/2009 | Atkinson et al. | |
| 2009/0139283 | A1 | * | 6/2009 | Peng | E05B 65/1013 70/92 |
| 2010/0066101 | A1 | | 3/2010 | Shen | |
| 2010/0263416 | A1 | * | 10/2010 | Tsai | E05C 9/026 70/91 |
| 2011/0047874 | A1 | * | 3/2011 | Lowder | E05B 65/1053 49/31 |
| 2012/0000257 | A1 | * | 1/2012 | Wheeler | E05B 63/0013 70/91 |
| 2012/0023824 | A1 | * | 2/2012 | Mason | E05F 15/622 49/340 |
| 2014/0130624 | A1 | | 5/2014 | Chiang et al. | |
| 2014/0132009 | A1 | * | 5/2014 | Chiang | E05C 3/124 292/164 |
| 2016/0002963 | A1 | | 1/2016 | Kondi et al. | |
| 2016/0069107 | A1 | | 3/2016 | Uyeda et al. | |
| 2016/0168879 | A1 | | 6/2016 | Chen et al. | |
| 2016/0376816 | A1 | | 12/2016 | Graham | |
| 2017/0191288 | A1 | | 7/2017 | Lin | |
| 2017/0275922 | A1 | | 9/2017 | Zeus et al. | |
| 2017/0292293 | A1 | * | 10/2017 | Lin | E05C 3/16 |
| 2017/0314299 | A1 | | 11/2017 | Chen et al. | |
| 2019/0178006 | A1 | * | 6/2019 | Capozziello | E05B 63/20 |

FOREIGN PATENT DOCUMENTS

| | | | | | |
|---|---|---|---|---|---|
| CH | 651886 | A5 | | 10/1985 | |
| DE | 3318472 | C2 | * | 5/1983 | E05B 59/00 |
| DE | 3642783 | A1 | * | 12/1986 | E05C 9/20 |
| DE | 10016609 | A1 | * | 10/2001 | F16B 37/0892 |
| DE | 20 2009 005 345 | U1 | | 6/2009 | |
| EP | 0 229 582 | A1 | | 7/1987 | |
| EP | 0 947 651 | A1 | | 10/1999 | |
| EP | 1520949 | A2 | * | 4/2005 | E05B 63/042 |
| EP | 1 681 413 | A2 | | 7/2006 | |
| EP | 1 717 395 | A1 | | 11/2006 | |
| EP | 1 321 613 | B1 | | 7/2009 | |
| EP | 3 822 438 | A1 | | 5/2021 | |
| FR | 1 376 505 | A | | 10/1964 | |
| FR | 2 601 063 | A1 | | 1/1988 | |
| FR | 2733012 | A1 | * | 10/1996 | E05B 79/12 |
| FR | 2 924 737 | A1 | | 6/2009 | |
| GB | 2 101 667 | A | | 1/1983 | |
| GB | 2 168 748 | A | | 6/1986 | |
| GB | 2 279 989 | A | | 1/1995 | |
| GB | 2 330 616 | A | | 4/1999 | |
| GB | 2 503 954 | A | | 1/2014 | |
| GB | 2554725 | A | * | 4/2018 | E05C 9/22 |
| KR | 10-0404749 | B1 | | 11/2003 | |

(56) References Cited

FOREIGN PATENT DOCUMENTS

| | | | | | |
|---|---|---|---|---|---|
| KR | 20-0456002 | Y1 | | 10/2011 | |
| TW | M524384 | U | * | 3/2016 | ......... E05B 17/2034 |
| WO | WO 2010/051592 | A1 | | 5/2010 | |

OTHER PUBLICATIONS

PCT/US2019/066849, Feb. 24, 2020, Invitation to Pay Additional Fees.
PCT/US2019/066849, Apr. 28, 2020, International Search Report and Written Opinion.
Invitation to Pay Additional Fees for International Application No. PCT/US2019/066849, dated Feb. 24, 2020.
International Search Report and Written Opinion for International Application No. PCT/US2019/066849, dated Apr. 28, 2020.
[No Author Listed] Appendix A.1—Test Protocols. Texas Tech University, National Wind Institute, Debris Impact Facility. Mar. 31, 2017:1-5.
[No Author Listed] Securitech Multi-Bolt. Version 9.3. 2012, 2 pages.

* cited by examiner

707

SIDE LATCH EXIT DEVICE

RELATED APPLICATIONS

This application is a continuation-in-part of U.S. patent application Ser. No. 16/718,349, filed on Dec. 18, 2019, which claims the benefit under 35 U.S.C. § 119(e) to U.S. Provisional Application Ser. No. 62/783,487, entitled "SIDE LATCH EXIT DEVICE", filed on Dec. 21, 2018, each of which is herein incorporated by reference in its entirety.

FIELD

Disclosed embodiments are related to a side latch exit device.

BACKGROUND

Vertical rod exit devices are traditionally used to secure a door at multiple latching points. Conventionally, doors are secured along the threshold and transom of the door and optionally along the jamb. Depending on the particular application, the vertical rods may be concealed inside of the door or attached to the outside of an interior surface of the door.

SUMMARY

In some embodiments, an exit device includes an actuator including a lever, a first cam, and a second cam, where the first cam is configured to convert an actuation force applied to the lever to a first force in a first direction, and where the second cam is configured to convert an actuation force applied to the lever to a second force in a second direction. The exit device also includes a first rod coupled to the first cam configured to transmit the first force in the first direction, a second rod coupled to the second cam configured to transmits the second force in the second direction, and a transom latch including a latch head configured to move between an engaged position and a disengaged position coupled to the first rod, where, when the first rod transmits the force in the first direction, the latch head is moved from the engaged position to the disengaged position. The exit device also includes a side latch including a hook latch head configured to move between a hook engaged position and a hook disengaged position coupled to the second rod, where, when the second rod transmits the force in the second direction, the hook latch head is moved from the hook engaged position to the hook disengaged position.

In some embodiments, an actuator for an exit device includes a chassis, a lever rotatably mounted to the chassis by a hinge portion and including a cam engagement portion, a first cam coupled to a first rod holder, where the first rod holder is slidably disposed in the chassis which allows movement of the first rod holder along a first axis, and a second cam coupled to a second rod holder, where the second rod holder is slidably disposed in the chassis which allows movement of the second rod holder along a second axis. The cam engagement portion engages the first cam and the second cam concurrently when the lever is rotated about the hinge by a user to move the first rod holder in a first direction along the first axis and the second rod holder in a second direction along the second axis.

In some embodiments, a rod actuated mortise latch includes a chassis configured to be secured to a door and a rod coupler including a channel configured to receive an associated rod of an exit device. At least two grooves are formed in the channel in a transverse direction relative to the channel, and the at least two grooves are configured to receive a retaining ring disposed on the associated rod.

In some embodiments, a method of installing a rod actuated mortise latch includes providing a door including a concealed rod and a mortise opening, wherein a portion of the concealed rod is disposed in the mortise opening, attaching a retaining ring to the portion of the concealed rod in the mortise opening, inserting a mortise latch having a chassis and a rod coupler into the mortise opening, and releasably securing the rod coupler to the concealed rod, whereby the rod coupler engages the retaining ring.

In some embodiments, a door includes a first door panel and an exit device attached to the first door panel. The exit device includes an actuator including a lever, a first cam, and a second cam, where the first cam is configured to convert an actuation force applied to the lever to a first force in a first direction, and where the second cam is configured to convert an actuation force applied to the lever to a second force in a second direction. The exit device also includes a first rod coupled to the first cam configured to transmit the first force in the first direction, a second rod coupled to the second cam configured to transmits the second force in the second direction, and a transom latch including a latch head configured to move between an engaged position and a disengaged position coupled to the first rod, where, when the first rod transmits the force in the first direction, the latch head is moved from the engaged position to the disengaged position. The exit device also includes a side latch including a hook latch head configured to move between a hook engaged position and a hook disengaged position coupled to the second rod, where, when the second rod transmits the force in the second direction, the hook latch head is moved from the hook engaged position to the hook disengaged position. When the first door panel is secured by the latch head in an engaged position and the hook latch head in the hook engaged position, the door withstands impact from a 6.8 kg 2×4 piece of lumber traveling at a speed between 80 mph and 100 mph.

In some embodiments, a rod holder for a latching device includes a rod holder chassis configured to receive a rod and a pawl slidably disposed in the rod holder chassis, where the pawl is configured to move between an engaged position and a disengaged position, and where the pawl is configured to engage a ratchet tooth of the rod. The rod holder may also include a handle coupled to the pawl and configured to move the pawl between the engaged position and the disengaged position, and a lockout slidably disposed in the rod holder chassis, where the lockout is configured to move between a locking position and an unlocking position, and where the lockout is configured to lock the pawl in the engaged position or the disengaged position when the lockout is in the locking position.

In some embodiments, a rod actuated mortise latch includes a chassis configured to be secured to a door and a rod coupler. The rod coupler includes a channel configured to receive an associated rod of a latching device including a threaded portion and a nut, where the channel is configured to inhibit rotation of the nut relative to the channel, and a stop configured to engage the nut to allow transmission of longitudinal force between the associated rod and the rod coupler.

In some embodiments, a method of installing a rod actuated mortise latch includes inserting a rod into a door, where the rod includes a threaded portion including a nut, aligning the threaded portion with a mortise opening formed in the door, inserting a mortise latch having a chassis and a rod coupler into the mortise opening; receiving the nut in a channel of the rod coupler, where the channel secures the nut and inhibits rotation of the nut relative to the channel, and rotating the rod to move the nut along the channel into engagement with a stop of the rod coupler.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
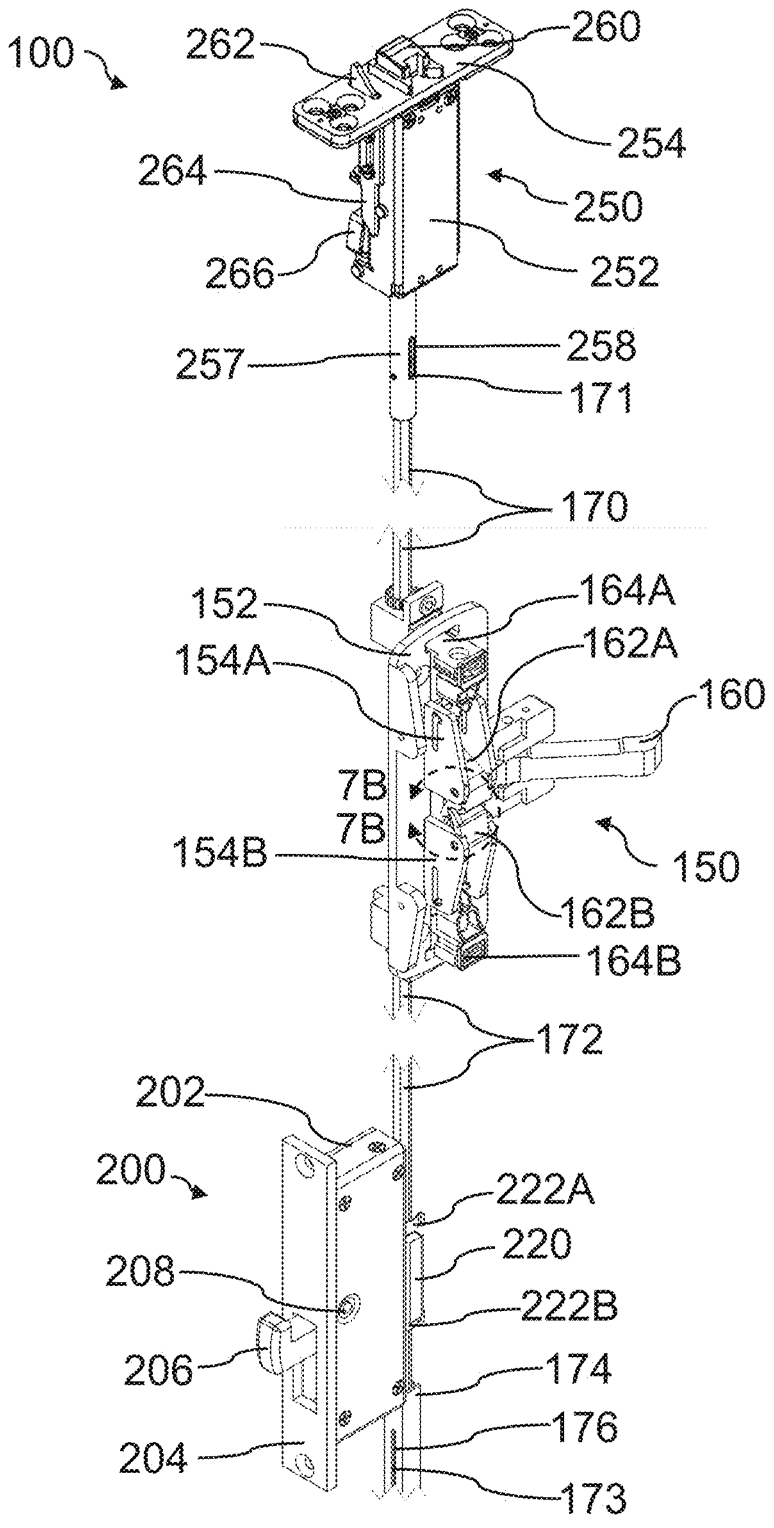
FIG. 1 is a perspective view of one embodiment of an exit device including a side latch.

Traditionally, multi-point latching exit devices are employed in doors to provide additional security or strength. These conventional exit devices employ vertical rods or tethers linked to a central actuator, by which a user can operate multiple latches with the same actuator. The vertical rods may be attached to the exterior of an interior door surface or may be concealed inside of the door. Typically, these exit devices include a transom latch, a jamb latch, and a threshold latch providing three-point fastening for the door which is suitable for environments with high wind and the associated risks of pressure and windborne objects impacting the secured door. Because conventional multi-point exit devices include a threshold latch, space must be made in the floor to accommodate the threshold latch. As many commercial floors are composed of a concrete slab, the installation of conventional threshold latches may be an expensive, time consuming, and laborious process. Additionally, because the threshold latch is formed in the floor, a threshold latch head and corresponding latch head receptacle may collect dirt or grime which may degrade the performance of the exit device over time or inhibit secure locking. In cases where the exit device is at least partially concealed inside of a door, maintenance, or repairs of threshold latches with degraded performance may be expensive and time consuming. Additionally, installation or removal of threshold latches concealed in the door typically require removal of the door panel which is time consuming and labor intensive.

In view of the above, the inventors have recognized the benefits of a multi-point locking or latching device which includes a transom latch coupled to a first rod and a side latch coupled to a second rod which in combination secure a door. The side latch may include a hook latch head configured to positively grasp the door jamb when engaged. Such an arrangement may be beneficial to withstand high wind pressure loads and windborne objects in accordance with modern safety standards. The side latch may be easily installed or removed via a mortise opening in the door without removal of a door panel. The inventors have also recognized the benefits of an actuator including two cams which apply force to the first and second rods concurrently when a lever is rotated to promote reliable activation of the transom latch and side latch.

In some embodiments, an exit device includes an actuator, a transom latch, and a side latch. The actuator may be operatively coupled to the transom latch and the side latch so that the transom latch and side latch may be operated concurrently by a single actuation of the actuator. Accordingly, in some embodiments, the actuator may be connected to the transom latch by a first (i.e., upper) rod and the side latch connected to the side latch by a second (i.e., lower) rod. The first rod and second rod may be configured to move substantially linearly along a first axis and a second axis, respectively. Accordingly, when the actuator is actuated by a user, the first rod and second rod may be moved linearly along their respective axes to operate the transom latch and side latch. This may be accomplished in some embodiments by a cam arrangement in the actuator including a lever, a first cam, and a second cam. The first cam and second cam may be operatively coupled to the first rod and second rod, respectively, and may be configured to move the first rod and second rod when the lever is actuated (e.g., rotated). In particular, the lever may engage the first cam to move the first rod in a first direction to operate the transom latch and may engage the second cam to move the second rod in a second direction to operate the side latch. Thus, according to this embodiment, the transom latch and side latch may be operated concurrently by a single actuation of the lever.

In some embodiments, a side latch includes a chassis, a rod coupler, and a hook latch head. The hook latch head may be rotatably mounted to the chassis and may also include a plurality of gear teeth disposed in an arc. The rod coupler may be configured to receive a rod which is coupled to an exit device actuator and may be slidably mounted to the chassis by a guide rail, slot, or other suitable arrangement so that the rod coupled moves with the connected rod. The rod coupling may also include a plurality of gear teeth arranged in in a line which are configured to intermesh with the hook latch head gear teeth, so that the hook latch head forms a pinion and the rod coupler forms a rack. Accordingly, movement of the connected rod may be used to rotate the hook latch head between a hook engaged position and a hook disengaged position. Thus, actuation of a rod via an actuator may be used to move the hook latch head between the engaged and disengaged positions to selectively secure a door.

In some embodiments, a transom latch includes a latch head, a lockout, a trigger, and a biasing member. The latch head may be configured to move between an engaged position and a disengaged position. The latch head may also be configured to be operatively coupled to an associated rod which may move the latch head between the engaged and disengaged positions. The lockout may be configured to allow movement of the latch head toward the disengaged position but prevent movement toward the engaged position, thereby retaining the latch head in the disengaged position. The trigger may be configured as a second latch head including an inclined face and configured to move between an extended position and a retracted position. When the trigger is moved from the extended position to the retracted position, the trigger may release the lockout from the latch head to allow the latch head to move from the disengaged position toward the engaged position. For example, the trigger may be moved to the retracted position by an associated door transom strike when an associated door is closed to allow the latch head to move toward the engaged position to secure the door either manually or automatically. The biasing member of the transom latch may be used to urge or bias the latch head toward the engaged position. Accordingly, the biasing member may allow the latch head to automatically move toward the engaged position when released by the trigger. In some embodiments, the biasing member may also transmit biasing force to an associated rod to bias an associated exit device toward a secure position (i.e., where any latch heads are in the engaged position).

In some embodiments, a side latch may include a rod coupler including a plurality of grooves which promote simple installation of the side latch without removal of a door panel from a hinge interface. In cases where a concealed rod coupled to an actuator is disposed in a door, a portion of the concealed rod may be accessible through a mortise opening. The concealed rod may have a retaining ring (e.g., a spring clip) attached to the conceal rod in an annular groove formed in the rod. The retaining ring may have an outer diameter larger than that of the concealed rod so that the retaining ring may be used to transmit longitudinal force to the concealed rod (i.e., force in a direction of a longitudinal axis of the concealed rod). The rod coupler may include a channel configured to receive the concealed rod and a plurality of grooves formed in a transverse direction relative to the channel to receive the retaining ring. Accordingly, when the concealed rod is received in the rod coupler, longitudinal force may be transmitted between the rod coupler and the concealed rod by the retaining ring and the groove in which the retaining ring is received. In some embodiments, the rod coupler may include at least one spring clip configured to releasably attach the rod coupler to the concealed rod and inhibit removal of the concealed rod from the channel.

In some embodiments, a method for installing a side latch includes providing a door including a concealed rod and a mortise opening, where a portion of the concealed rod is disposed in the mortise opening. Accordingly, the concealed rod may be accessible through the mortise opening. The method may also include attaching a retaining ring to the concealed rod through the mortise opening. Attaching the retaining ring may include attaching the retaining ring to an annular groove formed in the concealed rod. The retaining ring may be a spring clip which is configured to be securely attached to the annular groove. In some embodiments, the concealed rod may be provided with the retaining ring pre-attached. The method may also include inserting a mortise latch including a chassis and a rod coupler into the mortise opening and releasably securing the rod coupler to the concealed rod. Releasably securing the rod coupler to the concealed rod may include receiving the concealed rod in a channel, receiving the concealed rod in at least one spring clip, and receiving the retaining ring in one or a plurality of grooves formed in a transverse direction across the channel. The channel and grooves may be open, so that when the mortise lock is inserted into the mortise opening the concealed rod is automatically secured to the rod coupler. In some embodiments, each of the plurality of grooves may include inclined lead-ins adjacent each of the grooves so that the retaining ring is reliably receiving in a slot when the mortise lock is inserted into the mortise opening. Thus, the mortise lock may be repeatable and reliably secured to the concealed rod in the door without removing the door panel.

In addition to the above, the inventors have recognized the benefits of a multi-point latching device configured to allow adjustment of the concealed rods from an actuator of the latching device. In particular, the inventors have appreciated the benefits of a rod holder which is configured to receive and reliably engage a concealed rod for transmission of linear forces. The rod holder may include a lockout which inhibits the rod from being disengaged from the rod holder. In some embodiments, the rod holder may allow the rod to be rotated while the rod holder allows transmission of linear forces between the rod holder and the rod. In some embodiments, the rod may be rotated from the rod holder such that an effective length of the rod relative to the actuator and a transom or bottom latch may be adjusted. In some cases, such an arrangement allows the concealed rods to be inserted into the door with a corresponding transom latch or bottom latch, which may simplify installation and adjustment of the exit device.

In some embodiments, a rod holder for an exit device includes a rod holder chassis configured to receive a rod disposed in a door. The rod holder chassis may be configured to be inserted into an opening formed in a door, where an internal rod may be received into the rod holder chassis. The rod holder may also include a pawl slidably disposed in the chassis that is configured to move between an engaged position and a disengaged position. The rod may be configured with at least one ratchet tooth (e.g., a plurality of ratchet teeth) which the pawl is configured to engage in the engaged position to inhibit relative movement of the rod relative to the rod holder chassis, thereby allowing force transmission between the rod holder chassis and the rod. In some embodiments, the rod holder may include a pawl spring configured to bias the pawl toward the engaged position. According to such an embodiment, the pawl may automatically engage a rod when the rod is received in the rod holder chassis. In some embodiments, the at least one ratchet tooth of the rod may be configured to move the pawl toward the disengaged position against the biasing force of the pawl spring as the rod moves into the rod holder chassis. In this manner, the rod may be received in the rod chassis without manually moving the pawl to the disengaged position. Of course, in other embodiments, the pawl may be manually moved to the disengaged position before the rod is received by the rod chassis, as the present disclosure is not so limited. In some embodiments, the rod holder may include a handle coupled to the pawl and configured to allow a user to move the pawl between the engaged position and the disengaged position. In some embodiments, the handle may include threads configured to thread into the rod holder chassis to secure the pawl in the engaged position. Of course, the handle may have any suitable configuration, as the present disclosure is not so limited.

In some embodiments, a rod holder may include a lockout slidably disposed in a rod holder chassis. The rod holder may be configured to move between a locking position and an unlocking position. The lockout may be configured to selectively engage the pawl to maintain the pawl in either the engaged position or the disengaged position. That is, in the locking position the lockout is configured to lock the pawl into either the engaged position or disengaged position. In some embodiments, the lockout may slide in a direction transverse to a direction of motion of the pawl. In one such embodiment, the lockout out may slide perpendicular to the pawl. In some embodiments, the lockout may be configured to engage a notch formed in the pawl to maintain the pawl in the disengaged position. In some embodiments, the lockout may be configured to slide into a path of the pawl to lock the pawl in the engaged position. According to this embodiment, the lockout may block the pawl from moving from the engaged position toward the disengaged position. In some embodiments, when the pawl is between the engaged position and the disengaged position, the pawl may maintain the lockout in the unlocking position. For example, the lockout may abut the pawl such that the pawl inhibits the lockout from moving to the locking position. In some embodiments, the rod holder may include a lockout spring configured to bias the lockout toward the locking position. According to such an embodiment, the lockout may move automatically from the unlocking position to the locking position when the pawl moves into either the engaged position or disengaged position. In this manner, the lockout may be configured to lock the pawl into either the engaged position or disengaged position automatically. In some embodiments, a user may move the lockout from the locking position to the unlocking position to allow the pawl to be subsequently moved.

In some embodiments, a method of coupling a rod to latching device actuator may include placing a rod holder in a door (e.g., through a door opening). The method may also include moving a pawl of the rod holder to a disengaged position with a handle. In some embodiments, the method may include locking the pawl in the disengaged position with a lockout in a locking position. The method may also include receiving a rod into a rod chassis of the rod holder. In some embodiments, the method may include rotating the rod by rotating an adjustment nut. Rotating the rod may cause the rod to thread or unthread from a bottom latch and/or transom latch. The method may also include moving the lockout to an unlocking position. In some embodiments, moving the lockout to the unlocking position may cause the pawl to automatically move to an engaged position (e.g., under force from a pawl spring). In the engaged position, the pawl may engage at least one ratchet tooth of the rod. In some embodiments, the method may also include threading the handle into the rod chassis to move the pawl into the engaged position. In some embodiments, when the pawl is moved into the engaged position the lockout may automatically move to the locking position (e.g., under force from a lockout spring) to lock the pawl in the engaged position.

In some cases, variations in the lengths of doors and manufacturing tolerances are such that discrete adjustment points for a vertical rod may not result in an appropriate fitment for a particular door. For example, in some cases, an adjustment point between two discrete adjustment points for a latch may result in the desired protrusion and operation of the latch. Accordingly, in providing discrete adjustment points, a user may select between two less desirable adjustment points for the rod. In view of the above, the inventors have appreciated the benefits of a rod actuated mortise latch that provides for infinite adjustability within a predetermined range. That is, the rod actuated mortise latch does not provide one or more discrete adjustment points but provides for progressive adjustability such that a desired fit may be achieved between a latch, door, and latching device actuator.

In some embodiments, a rod actuated mortise latch includes a chassis configured to be secured to a door. For example, in some embodiments, the chassis may be configured to be received in a mortise formed in a side of the door. The rod actuated mortise latch may also include a rod coupler configured to secure an associated rod of a latching device. In particular, the rod coupler may include a channel configured to receive an associated rod of the latching device. The rod of the latching device may include a threaded portion having a nut disposed on the threaded portion. The channel may be configured to inhibit rotation of the nut relative to the channel. For example, in some embodiments, the channel may include at least one flat configured to engage the nut to transmit torque between the channel and nut. As the nut is not able to rotate relative to the channel, rotation of the rod may move the nut in one of two directions along the threaded portion. The rod coupler may also include a stop configured to engage the nut to allow transmission of longitudinal force between the rod and the rod coupler. During installation, the rod may be rotated to adjust the position of the nut such that is in contact with the stop. In some embodiments the rod actuated mortise latch includes a latch head configured to move between an engaged position and a disengaged position, where the movement of rod coupler along a longitudinal axis of an associated road moves the latch head between the engaged and disengaged positions. In some embodiments, the latch head includes a hook.

In some embodiments, a method of installing a rod actuated mortise latch includes inserting a rod into a door, where the rod includes a threaded portion including a nut threaded thereon. The method may also include aligning the threaded portion with a mortise opening formed in the door. The method may also include inserting a mortise latch having a chassis and a rod coupler into the mortise opening. The method may also include receiving the nut in a channel of the rod coupler, where the channel secures the nut and inhibits rotation of the nut relative to the channel. However, the channel may allow movement of the nut along the threaded portion of the rod as the rod rotates. The method may also include rotating the rod to move the nut along the channel and into engagement with a stop of the rod coupler. In some embodiments, the method may include transmitting force between the rod and the rod coupler with the nut.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a perspective view of one embodiment of an exit device 100 including an actuator 150, a side latch 200, and a transom latch 250. As shown in FIG. 1, a first rod 170 operatively couples the actuator to the transom latch 250 and a second rod 172 operatively couples the actuator to the side latch 200. According to the depicted embodiment, the exit device is configured to be mounted inside of the door (not shown in FIG. 1), so that a majority of the components are substantially concealed from view. Of course, the exit device may visible or partially concealed, as the present disclosure is not so limited. As shown in FIG. 1, the exit device is arranged with the first and second rods in a vertical orientation, with the transom latch configured to engage a door transom and the side latch configured to engage a door jamb. As the transom latch and side latch are both linked to the same centralized actuator, the transom latch and side latch may be actuated concurrently to selectively secure or release a door.

According to the embodiment shown in FIG. 1, the actuator 150 includes a chassis 152, a lever 160, a first cam 162A coupled to a first rod holder 164A, and a second cam 162B coupled to a second rod holder 164B. The lever is rotatably mounded to the chassis 152 and is configured to rotate about an axis which is parallel with a longitudinal axis of the first rod 170 and second rod 172. The first cam and second cam are also rotatably mounted to the chassis and are held by first guide wall 154A and second guide wall 154B, respectively, such that both of the cams rotate about an axis substantially perpendicular to the rotational axis of the lever. The first rod holder 164A is configured to secure the first rod 170 to the actuator and is slidably mounted to the chassis so that the first rod may be moved along its longitudinal axis (i.e., a first axis). Likewise, the second rod holder 164B is configured to secure the second rod 172 to the actuator and is slidably mounted to the chassis to allow the second rod to be moved along its longitudinal axis (i.e., a second axis). The first rod holder is coupled to an end of the first cam so that rotational motion of the first cam causes linear motion of the first rod holder along the first axis. The second rod holder is coupled to an end of the second cam so that rotational motion of the second cam causes linear motion of the second rod holder along the second axis. As will be discussed further with reference to FIGS. 4-5, when the lever is rotated (i.e., actuated), the lever engages at least one of the first cam and the second cam to rotate the first and second cams in opposite directions. As the first and second cams are coupled to the first and second rod holders, respectively, the first rod holder is moved in a first direction along the first axis and the second rod holder is moved in a second direction along the second axis as the cams are rotated. According to the embodiment shown in FIG. 1, the first direction and second direction may be opposite one another such that the first rod holder and second rod holder are moved closer to one another when the lever is actuated (e.g., rotated).

As shown in FIG. 1, the side latch 200 includes a chassis 202, a face plate 204 and a hook latch head 206. The chassis is configured to fit into a mortise opening formed in a door and may be secured to the door by the face plate. The hook latch head is rotatably mounted to the chassis via hook latch head pin 208. As shown in FIG. 1, the side latch is coupled to the second rod 172 by a rod coupler 220 which fits around the second rod. Spring clips 222A, 222B, releasably secure the second rod inside the rod coupler. As will be discussed further with reference to FIGS. 10-11, the rod coupler transmits longitudinal motion of the second rod into rotational motion of the hook latch head, so that movement of the second rod along the second axis may move the hook latch head between an engaged position and a retracted position. In the state shown in FIG. 1 the hook latch head is in an engaged position, projecting past the face plate 204 so that the hook latch head would engage an associated door jamb when adjacent a hook latch head receptacle. According to the embodiment of FIG. 1, the second rod 172 is disposed partially in a rod guide 174. The second rod guide includes a rod guide slot 176 which receives a second rod pin 173 disposed on the second rod. The second rod guide substantially constrains the second rod to linear movement along the second axis (i.e., the longitudinal axis of the second rod).

According to the embodiment of FIG. 1, the side latch may be disposed below a centerline of a door such that the door may be secured at different portions of the door (e.g., top and bottom portions). Without wishing to be bound by theory, the distance of the side latch head from the top of the door may at least partially determine the amount of deflection of a door place under pressure or impact loads. Accordingly, in some embodiments, the hook latch head of a side latch may positioned below a top of a door by a distance greater than ½ of the door length, ⅝ of the door length, ⅔ of the door length, ¾ of the door length, or any other appropriate distance. Correspondingly, the hook latch head may be positioned below a top of a door by a distance of less than ⅝ of the door length, ⅔ of the door length, ¾ of the door length, the door length, of any other appropriate distance. Combinations of the above noted ranges are contemplated, as the present disclosure is not so limited.

As shown in FIG. 1, the transom latch 250 includes a chassis 252, a face plate 254, a latch head 260, and a trigger 262. The latch head 260 may be directly coupled to the first rod 170 so that movement of the first rod along the first axis (i.e., a longitudinal axis of the first rod) moves the latch head between an engaged and disengaged position. According to the depicted embodiment, the latch head 260 does not include a substantially inclined face and will therefore not automatically retract when the latch head contacts a transom strike plate. In order to prevent interference or premature engagement of the latch head with a transom strike plate, the transom latch includes a lockout 266 which is controlled by the trigger 262. According to the embodiment of FIG. 1, the lockout is configured to allow movement of the latch head toward a disengaged position (i.e., where the latch head is substantially retracted to clear a transom strike plate without interference). However, the lockout is configured to prevent movement of the latch head toward an engaged position (i.e., where the latch head is substantially extended to engage a transom strike plate). Accordingly, when the transom latch head is retracted the lockout will retain the transom latch head in the disengaged position so that the transom latch head does not interfere with door opening or closing. The trigger 262 is configured to move between an extended position and a retracted position and includes an inclined face which is suitable to automatically retract the trigger when the trigger contracts a transom strike plate. As shown in FIG. 1, the trigger is configured to engage the lockout when the trigger is moved to the retracted portion with a lockout engagement portion 264 configured as a camming surface. When the trigger engages the lockout (e.g., along a camming surface) the lockout may release the transom latch head 260 so that the latch head may move to the engaged position to secure the door once the door is closed. Thus, the latch head and trigger arrangement shown in FIG. 1 may allow for automatic latching of the transom latch head without inclusion of an inclined face on the transom latch head. According to the embodiment shown in FIG. 1, the chassis 252 is coupled to a transom rod guide 257 which includes a transom rod guide slot 258 with receives a first rod pin 171 disposed on the first rod to substantially constrain the movement of the first rod to linear movement along the first axis (i.e., the longitudinal axis of the first rod).

Figure 2:
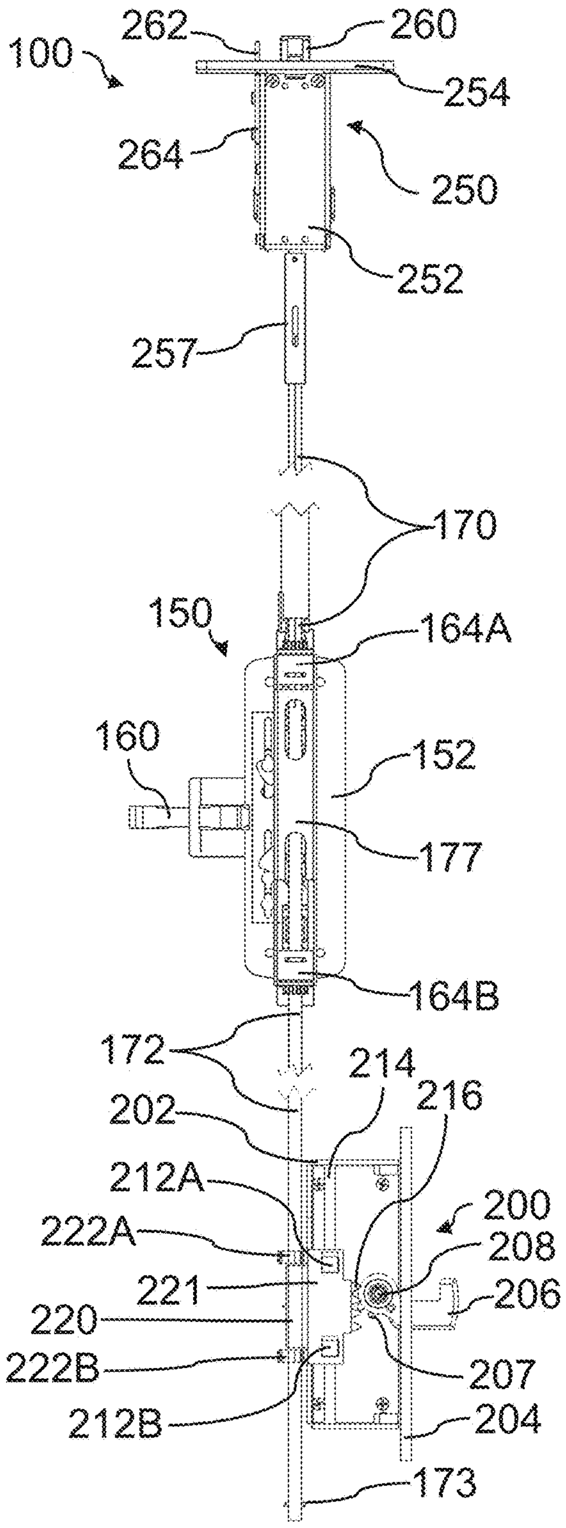
FIG. 2 is a rear elevation view of the exit device of FIG. 1.

FIG. 2 is a rear elevation view of the exit device 100 of FIG. 1. As shown in FIG. 2, the rear panel of the side latch 200 has been removed to show the internal components of the side latch. As discussed previously, the side latch includes a hook latch head 206 rotatably coupled to a chassis by a hook latch head pin 208 and a rod coupler 220 operatively coupled to the second rod 172 so that linear movement of the second rod is converted into rotational motion of the hook latch head. As shown in FIG. 2, the hook latch head includes a plurality of gear teeth 207 disposed in an arc in a circumferential arrangement around the hook latch head pin 208. Correspondingly, the rod coupler includes a slide body 221 which includes a plurality of gear teeth 216 configured to mesh with the teeth of the hook latch head. As shown in FIG. 2, the slide body 221 is disposed around guide rail 214 so that the slide body is constrained to move in a linear direction along the guide rail parallel to the longitudinal axis of the second rod. Accordingly, the rod coupler forms a rack, and the hook latch head forms a pinion so that linear movement of the second rod is converted into rotational movement of the hook latch head which may be used to move the hook latch head between the hook engaged and hook disengaged positions.

As shown in FIG. 2, the actuator 150 also includes a rear actuator rod guide 177 which is configured to substantially constrain the first rod 170 and first rod holder 164A as well as the second rod 172 and second rod holder 164B to linear movement along the first axis of the first rod and second axis of the second rod, respectively. Accordingly, the actuator may use camming motions to precisely and reliably move the first and second rods along their longitudinal axis to actuate the transom latch and side latch.

Figure 3:
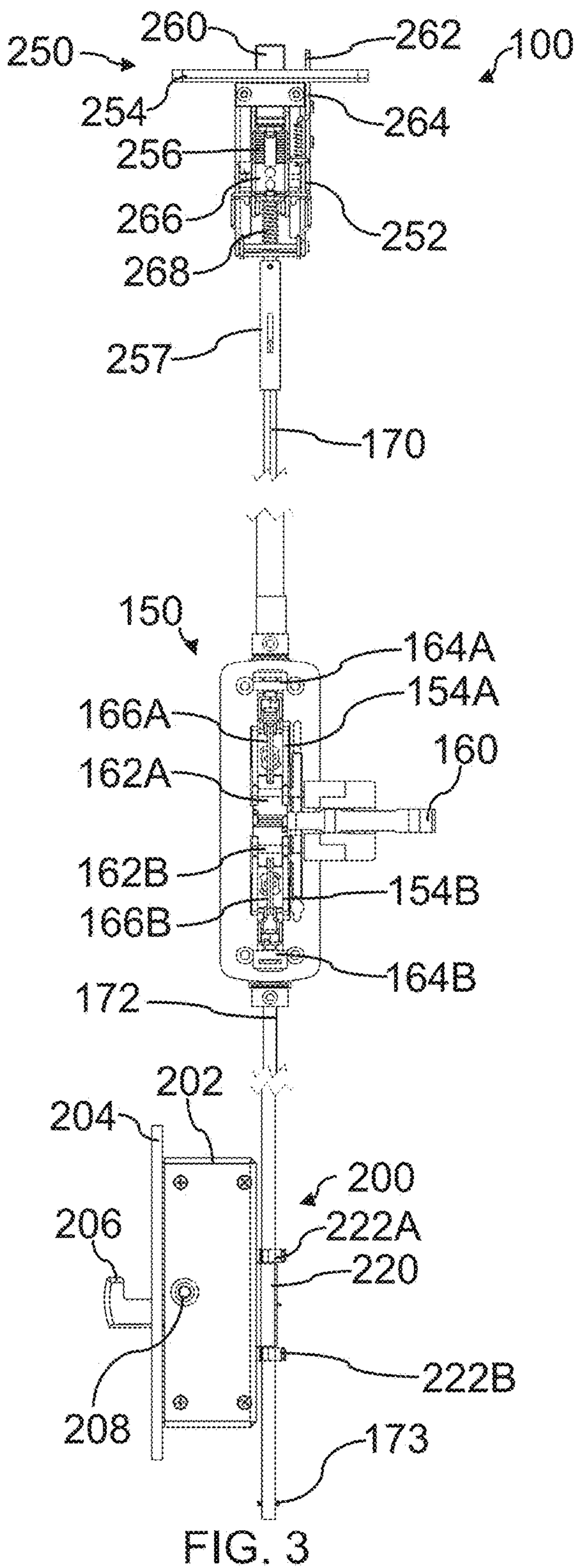
FIG. 3 is a front elevation view of the exit device of FIG. 1.

FIG. 3 is a front elevation view of the exit device 100 of FIG. 1. As discussed previously, the actuator 150 includes a lever 160, a first cam 162A, a second cam 162B which cooperate to move the first rod 170 and second rod 172 along the first axis and second axis, respectively. As shown in FIG. 3, the first cam is coupled to the first rod holder 164A by a first linkage 166A and the second cam is coupled to the second rod holder by a second linkage 166B. The first and second cam linkages are rotatably linked (e.g., by a linkage pin) to both their respective cams and rod holders so that the rotational motion of the cams may be converted into linear motion of the rod holders.

As discussed previously, the transom latch includes a trigger 262 and a lockout 266 which cooperate to allow the latch head 260 to automatically extend into a transom strike plate without interference when the door is being opened or closed. As shown in FIG. 3, the lockout 266 interfaces with a plurality of ratchet teeth 256 so that the latch head 260 is progressively retained at it is moved to the disengaged (i.e., retracted) position. When the trigger 262 is moved from the extended position shown in FIG. 3 to the retracted position, the lockout engagement portion 264 cams the lockout out of engagement with the ratchet teeth so that the latch head 260 may move to toward the engaged position. Of course, while ratchet teeth are employed in the depicted embodiment, any suitable progressive or non-progressive retaining element may be employed, as the present disclosure is not so limited. As shown in FIG. 3, the transom latch includes a biasing member configured as a compression spring which urges the latch head toward the engaged position. Accordingly, when released by the trigger, the latch head may automatically move to the engaged position under influence of the compression spring. Of course, while a compression spring is employed in the embodiment of FIG. 3, any suitable biasing member may be employed as the present disclosure is not so limited.

According to the embodiment shown in FIG. 3, the biasing member 268 may apply an urging force to the first rod 170 so that the first rod is urged to a position which corresponds to the transom latch head 260 being in an engaged position. As the urging force is transmitted through the first rod to the actuator and from the actuator to the side latch through the second rod, the hook latch head 206 may also be urged toward a hook engaged position. Thus, the linkage of the first rod and second rod through the actuator may allow a single biasing member to be employed in any one of the transom latch, actuator, and side latch. Such an arrangement may be beneficial to simplify installation and reduce parts and cost.

Figure 4:
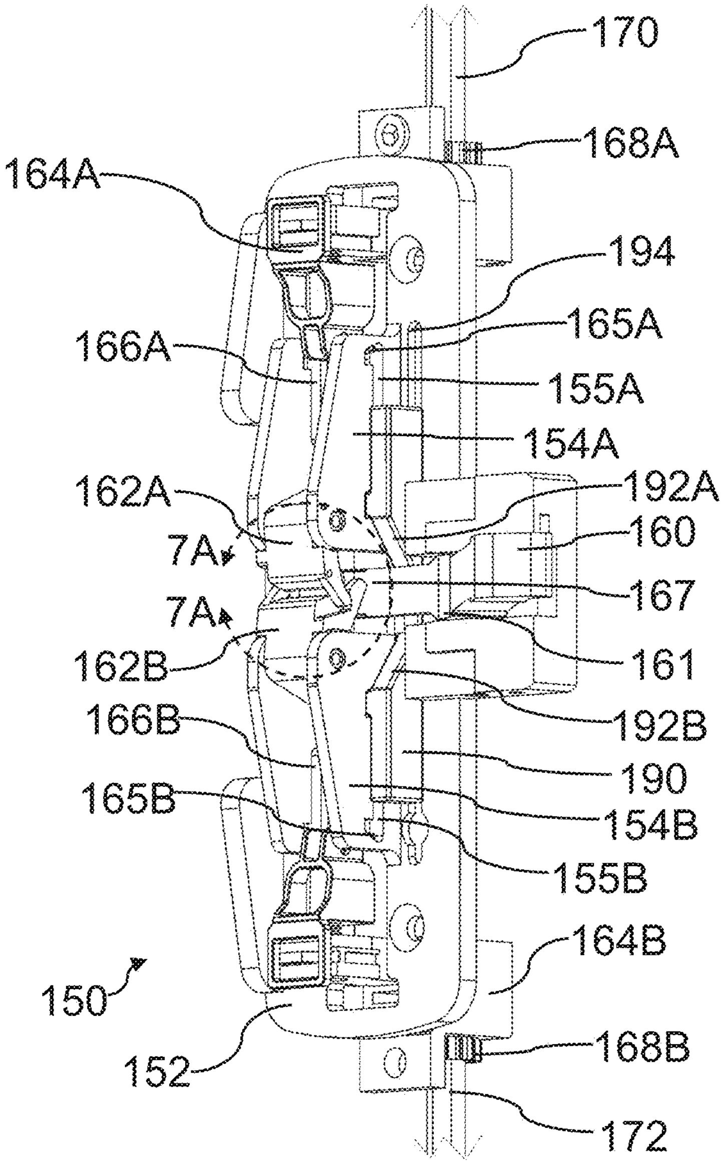
FIG. 4 is a perspective view of one embodiment of an actuator for the exit device of FIG. 1.

FIG. 4 is a perspective view of one embodiment of an actuator 150 for the exit device of FIG. 1. As discussed previously, the actuator is configured to allow a first rod 170 and a second rod 172 to move concurrently along a first axis (corresponding to a longitudinal axis of the first rod) and a second axis (corresponding to a longitudinal axis of the second rod), respectively. As best shown in FIG. 4, the lever 160 is rotatably mounted to the chassis by a hinge portion 161. A cam engagement portion 167 of the lever engages both the first cam 162A and the second cam 162B. The first cam and second cam are rotatably mounted to a first guide wall 154A and a second guide wall 154B, respectively. Accordingly, when the lever is rotated about the hinge portion, the cam engagement portion 167 will engage both the first cam and second cam to rotate the cams in opposite directions about parallel axes. The first cam is coupled to a first rod holder 164A by a first linkage 166A which converts the rotational motion of the cam to linear motion of the first rod holder. The first rod holder and first linkage are at least partially disposed in a first linkage slot 155A formed in the first guide wall 154A which at least partially constrains to the first linkage and first rod holder to linear movement. Similarly, the second cam is coupled to a second rod holder 164B by a second linkage 166B which is disposed at least partially in second linkage slot 155B formed in the second guide wall. According to the embodiment shown in FIG. 4, when the lever is rotated about the hinge portion 161, the cams draw the first rod holder and second rod holder closer together, thereby applying tension through the rods to a transom latch and/or side latch. Of course, in other embodiments, the cams may rotate to move the first rod holder and second rod holder further apart to apply compression through the rods, as the present disclosure is not so limited. As shown in FIG. 4, the relative position of the first and second rods to the first and second rod holder may be adjusted by rotating a first adjustment nut 168A or a second adjustment nut 168B, respectively.

As shown in FIG. 4, the actuator also includes a slider 190 disposed in a slider slot 194 formed in the chassis 152 of the actuator. The slider includes a first inclined camming surface 192A and a second inclined camming surface 192B which are configured to selectively engage the lever 160 to rotate the lever. As will be discussed further with reference to FIG. 6, the slider 190 may be operatively coupled to an interior handle or other actuator so that the lever may be actuated from a side of the door from which the lever is not accessible. When the slider engages the lever, the lever may be cammed to correspondingly rotate the first and second cams 162A, 162B to actuate an associated lock with the first rod 170 and second rod 172. According to the embodiment of FIG. 4, the lever may be operatively connected to a user interfacing element such as a paddle, push bar, or other suitable arrangement so that a user may easily actuate the lever.

Figure 5:
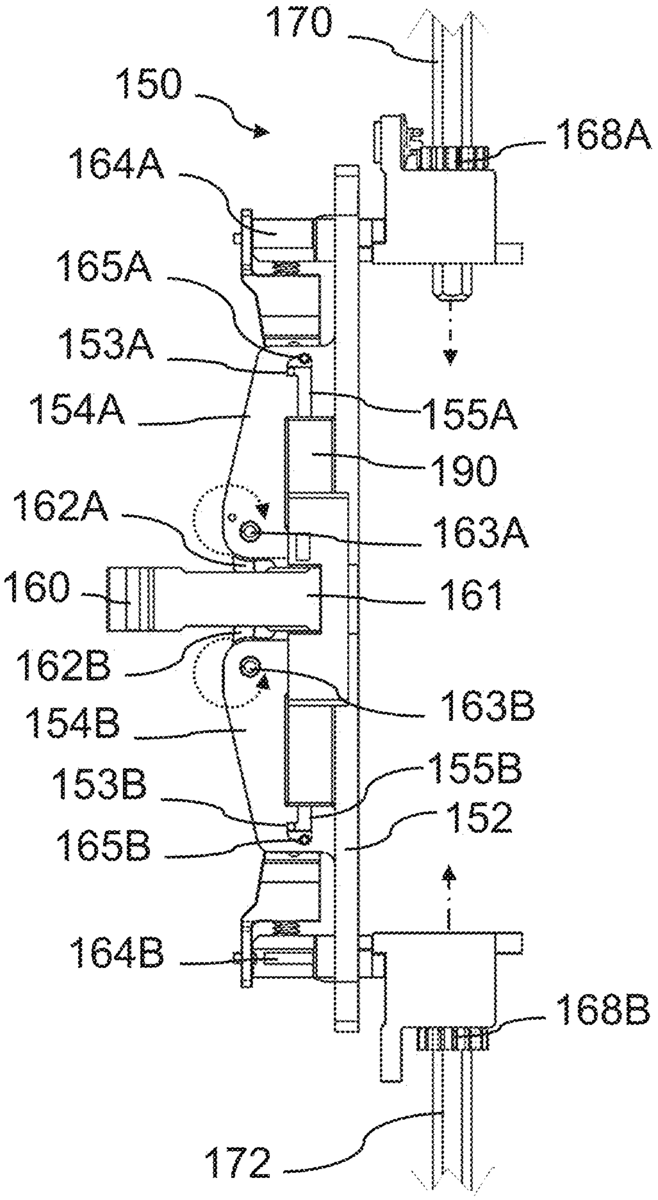
FIG. 5 is a right-side elevation view of the actuator of FIG. 4.

FIG. 5 is a right-side elevation view of the actuator 150 of FIG. 4. As best shown in FIG. 5, the first rod 170 and the second rod 172 are moveable along their longitudinal axes by movement of the first rod holder 164A and second rod holder 164B, respectively. The first rod holder is constrained at least partially to linear movement by first linkage pin 165A which is disposed in the first linkage slot 155A and couples the first rod holder to the first linkage (see FIG. 4). Likewise, the second rod holder is constrained at least partially to linear movement by second linkage pin 165B which is disposed in second linkage slot 155B and couples the second rod holder to the second linkage (see FIG. 4). According to the embodiment shown in FIG. 5, the first and second rods have coincident axes (i.e., the longitudinal axes of both rods are coincident). Accordingly, when the lever 160 is actuated the first and second rods are moved toward or apart from one another along the same coincident axis. As shown in FIG. 5, the first cam 162A is rotatably coupled to the first guide wall 154A by first cam pin 163A and the second cam 162B is rotatably coupled to the second guide wall 154B by a second cam pin 163B. In the depicted embodiment, the first cam and second cam are configured to rotate equally in opposite directions about their respective axes when engaged by the lever 160. As shown by the dashed arrows, in this embodiment, the first cam rotates clockwise relative to the page to move the first rod holder in a first direction (see dot-dash arrow) while the second cam rotates in a counterclockwise direction relative to the page to move the second rod holder in a second direction (see long-dot-dash arrow, where the first direction and the second direction are opposite one another and move the first and second rod holders closer together). Correspondingly, when the cams rotate in opposite directions the first and second rods will move further apart along their coincident axes. According to the embodiment of FIG. 5, rotation of the lever by a user may move the first and second rods closer together along their coincident axes, applying tension through the rods to move any associated lock to a disengaged position.

According to the embodiment shown in FIG. 5, the actuator includes first and second deadlatching catches 153A, 153B formed as a part of the first linkage slot 155A and second linkage slot 155B. The deadlatching catches are configured to prevent movement of the first rod holder 164A or second rod holder 164B without direct actuation of the lever 160. That is, force applied directly to the first or second rods may cause the first linkage pin 165A and second linkage pin 165B to engage and abut against first deadlatching catch 153A and second deadlatching catch 153B, respectively. Thus, force which is externally applied to the exit device (e.g., to a transom latch head or a hook latch head) may not move the rods to release the door. If the actuator is properly actuated, rotation of the first cam 162A and the second cam 162B may draw the first pin and second pin out of the deadlatching catches and into the first linkage slot 155A and second linkage slot 155B. The direction of rotation of the first cam and the second cam may be suitable to draw the pin out of the deadlatching catch to allow the first rod holder and second rod holder to move toward one another to release the door upon direct actuation of the lever 160.

Figure 6:
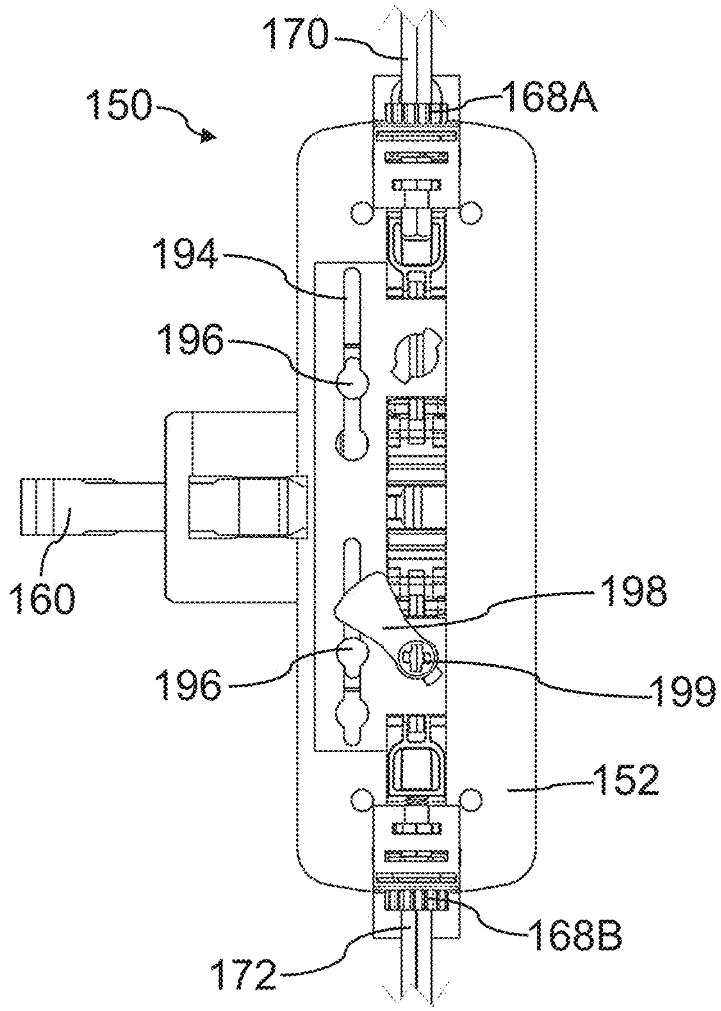
FIG. 6 is a rear elevation view of the actuator of FIG. 4.

FIG. 6 is a rear elevation view of the actuator 150 of FIG. 4. As best shown in FIG. 6, the actuator includes a handle mount 199 including a wing 198 configured to engage one of two tabs 196 of a slider (see FIG. 4). The tabs are disposed in slider slot 194. When an attached handle is turned, the wing 198 may engage one of the tabs 196 to slide the slider in the slider slot 194. As discussed previously, this movement may cause an inclined camming surface of the slider to engage the lever 160 to actuate the exit device (e.g., by moving the first rod holder and second rod holder toward one another). Of course, while a handle attachment and wing are shown in FIG. 6, any suitable arrangement may be employed to allow the exit device to be actuated from a side of the door where the lever is not accessible.

Figure 7A:
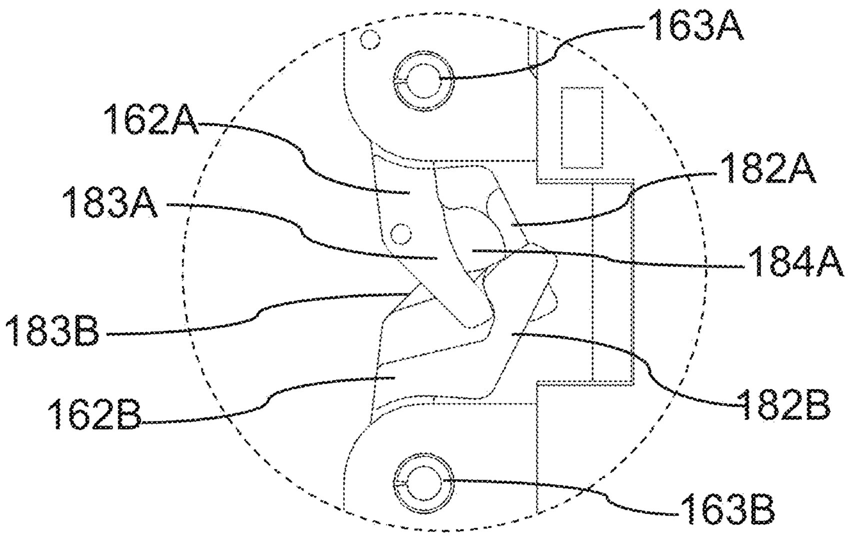
FIG. 7A is an enlarged right-side view of section 7A of FIG. 4.
Figure 7B:
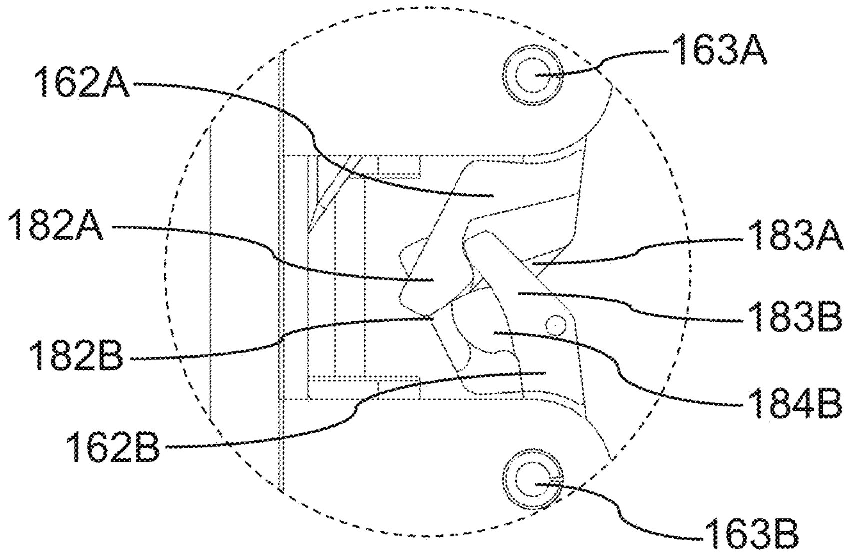
FIG. 7B is an enlarged left side view of section 7B of FIG. 1.

FIG. 7A is an enlarged right-side view of section 7A of FIG. 4 and FIG. 7B is an enlarged left side view of section 7B of FIG. 1 depicting first cam 162A and second cam 162B with the lever removed for clarity. As shown in FIG. 7A, the first cam includes a first cam lobe 184A, a first upper arm 183A, and a first lower arm 182A. Similarly, as shown in FIG. 7B, the second cam includes a second cam lobe 184B, a second upper arm 183B, and a second lower arm 182B. As shown in FIG. 7A, the first upper arm engages the second lower arm. As shown in FIG. 7B, the second upper arm engages the first lower arm. Accordingly, the first and second cams are intermeshed and will rotate together about the first cam pin 163A and second cam pin 163B, respectively. That is, even in the case of misalignment of the lever so that the lever only engages one of the cam lobes, the cams will rotate concurrently so that the coupled rod holders will also move concurrently. Additionally, forces transmitted from one rod holder another rod holder may be transmitted through the intermeshed cams without interference or input of the lever. Thus, the intermeshed cam may provide reliable concurrent actuation of the exit device.

Figure 8:
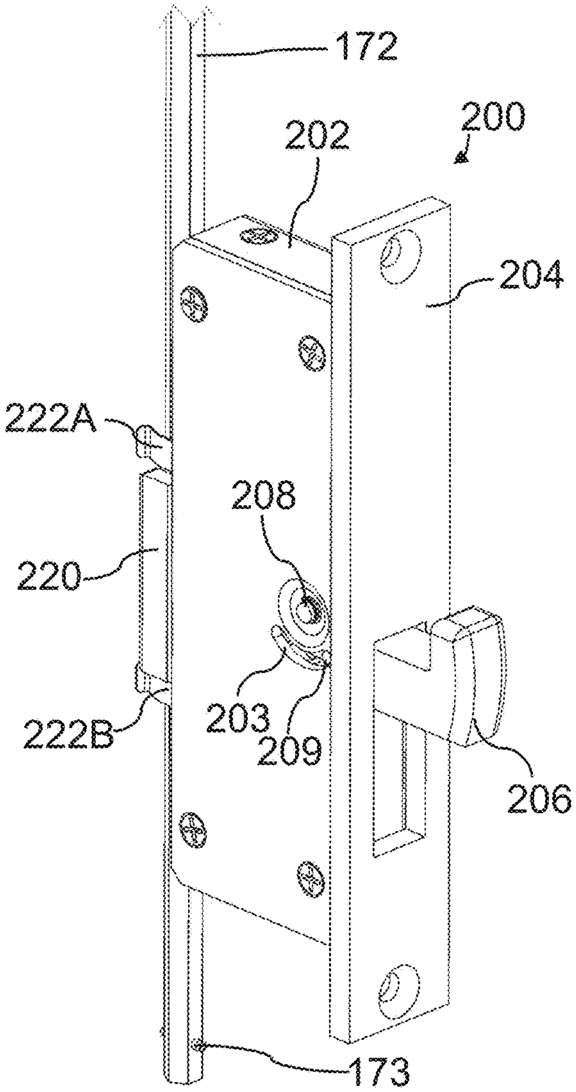
FIG. 8 is a perspective view of one embodiment of a side latch for the exit device of FIG. 1.

FIG. 8 is a perspective view of one embodiment of a side latch 200 for the exit device of FIG. 1. As discussed previously, the side latch includes a hook latch head 206 which is configured to rotate between a hook engaged position and a hook disengaged position. The hook latch head is rotatably mounted to the chassis 202 via a hook latch head pin 208. Additionally, as shown in FIG. 8, the chassis includes a hook latch head slot 203 which receives a hook latch head guide 209. In addition to guiding the hook latch head through rotational motion, the hook latch head slot 203 may also be used to set predetermined limits on the range of rotation of the hook latch head. That is, the hook latch head slot may determine the range of motion of the hook latch head so that the hook latch head may be reliably moved between the hook engaged and hook disengaged position to secure a door.

Figure 9:
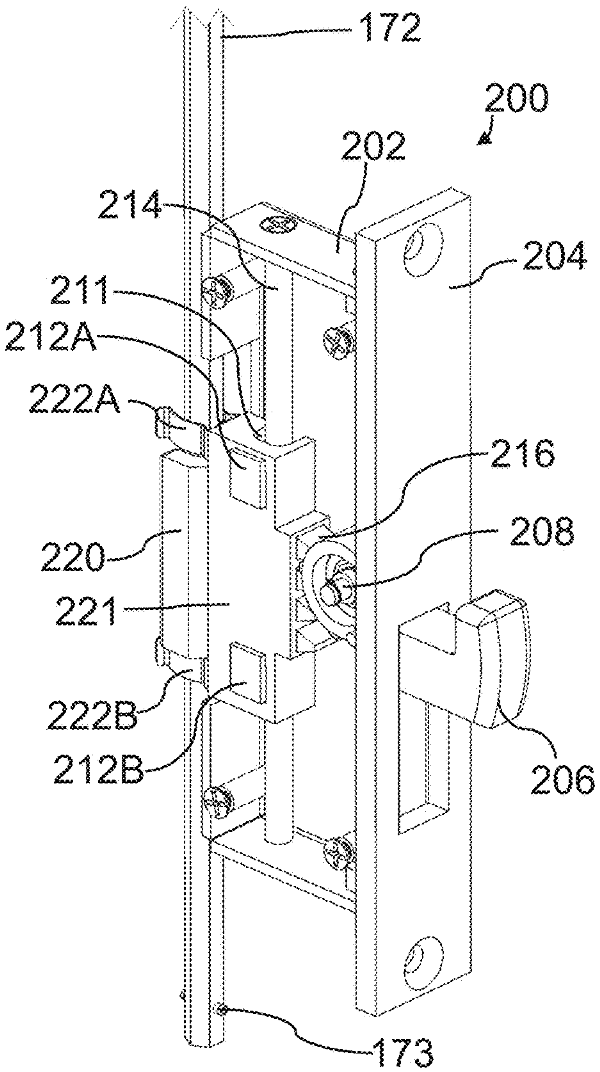
FIG. 9 is a perspective view of the side latch of FIG. 8 with a cover removed.

FIG. 9 is a cutaway perspective view of the side latch 200 of FIG. 8 with a portion of the chassis 202 removed to show the internal components of the side latch. As discussed previously, the side latch includes a rod coupler 220 and a hook latch head 206. The rod coupler includes a slide body 221 which receives linear motion of second rod 172 and converts it into rotary motion of the hook latch head via gear teeth 216. As best shown in FIG. 9, the slide body 221 is slidably coupled to the chassis 202 via a guide rail 214 disposed in a guide channel 211 formed in the slide body. The guide rail is secured in the guide channel 211 with a first clip 212A and a second clip 212B which secure the slide body to the guide rail but allow the slide body to move with second rod 172 to move the hook latch head between the hook engaged position and the hook disengaged position.

Figure 10:
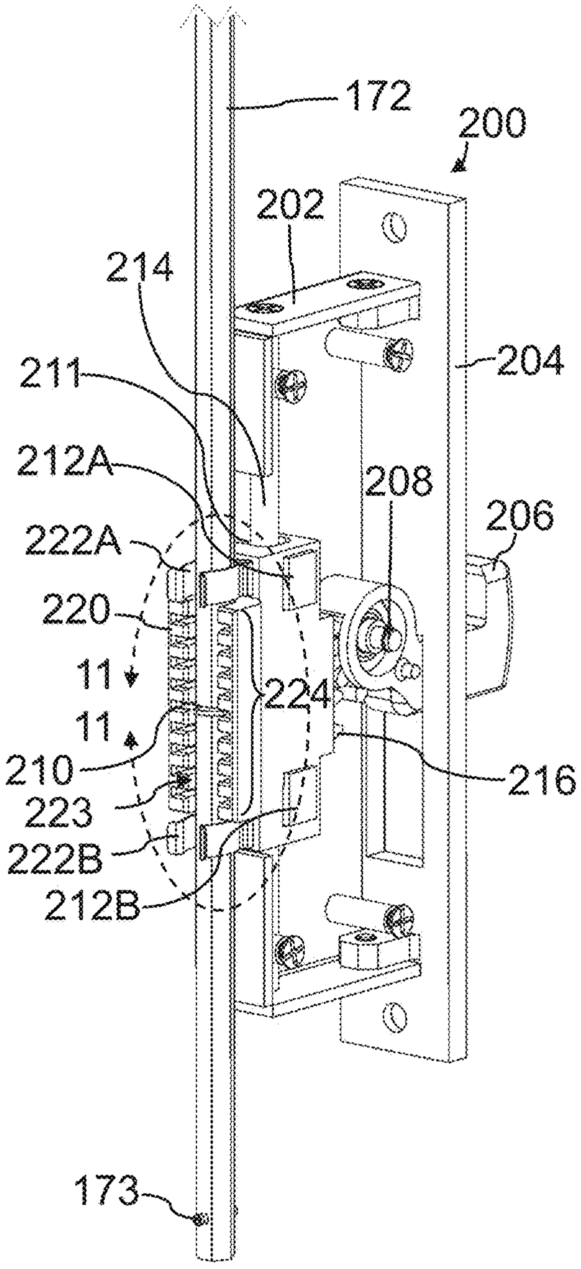
FIG. 10 is another perspective view of the side latch of FIG. 8 with a cover removed.

FIG. 10 is another cutaway perspective view of the side latch 200 of FIG. 8 showing the interface between the rod coupler 220 and the second rod 172. As shown in FIG. 10, the rod coupler includes a channel 223 which is formed to accommodate the second rod. The rod coupler also includes a first spring clip 222A and a second spring clip 222B which releasably secure the second rod 172 in the channel. The rod coupler also includes a plurality of grooves 224 which are formed in a transverse direction across the channel 223. The grooves are each configured to receive a retaining ring 210 which is attached to the second rod. The retaining ring may be releasably secured to an annular groove in the second rod so that the retaining ring may be used to transmit longitudinal force from the second rod. When the retaining ring is disposed in one of the grooves, force may be transmitted from the second rod to the rod coupler and vice versa via the interface between the groove and retaining ring. The spring clips 222A, 222B keep the retaining ring secure in the groove. Without wishing to be bound by theory, providing a plurality of grooves may allow for simplified installation of the side latch into a door. As will be discussed further with reference to FIG. 11, rather than adjusting the position of the retaining ring or second rod which may be concealed in a door, the side latch may be pushed into a mortise opening and the retaining ring will align with and engage the nearest groove of the plurality of grooves 224. Thus, minimal adjustment of the rod or the side latch may be necessary to install the side latch.

Figure 11:
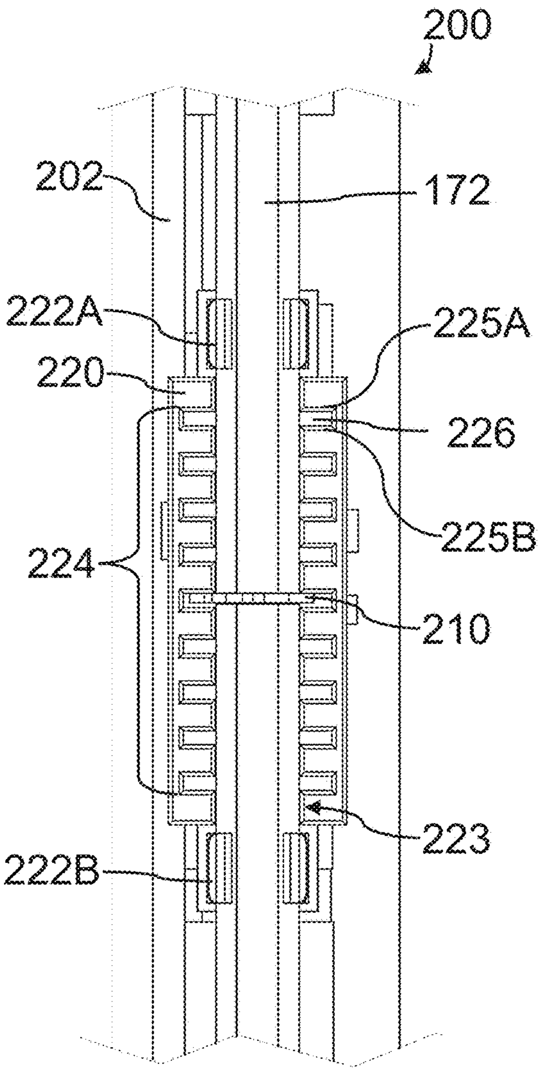
FIG. 11 is an enlarged elevation view of section 11 of FIG. 10.

FIG. 11 is an enlarged elevation view of section 11 of FIG. 10 showing the plurality of grooves 224 and retaining ring 210 in detail. As discussed previously, the second rod 172 is disposed in the rod coupler channel 223 and secured therein by spring clips 222A, 222B. Of course, while multiple spring clips are shown in FIGS. 10-11, any number of suitable retaining elements may be employed, as the present disclosure is not so limited. As best shown in FIG. 11, each of the plurality of grooves includes a first inclined lead-in 225A, and second inclined lead-in 225B, and a retaining groove 226. The inclined lead-ins may be suitable to guide the retaining ring into the nearest groove when the side latch is inserted into a mortise opening. That is, the lead-ins allow the second rod and retaining ring 210 to self-align with the nearest groove based on the camming action of the inclined lead-ins. Once disposed in the retaining groove 226, the retaining ring may transmit force between the rod coupler 220 and the second rod so that the hook latch head (see FIGS. 8-9) may be moved between a hook engaged and a hook disengaged position. According to the embodiment shown in FIGS. 10-11, the rod coupler includes nine grooves which provide a suitable amount of self-adjustability between the side latch and the second rod. However, any suitable number of grooves may be employed to provide any suitable amount of adjustability, including, but not limited to, as few as two grooves and as many as 20 grooves.

Figure 12:
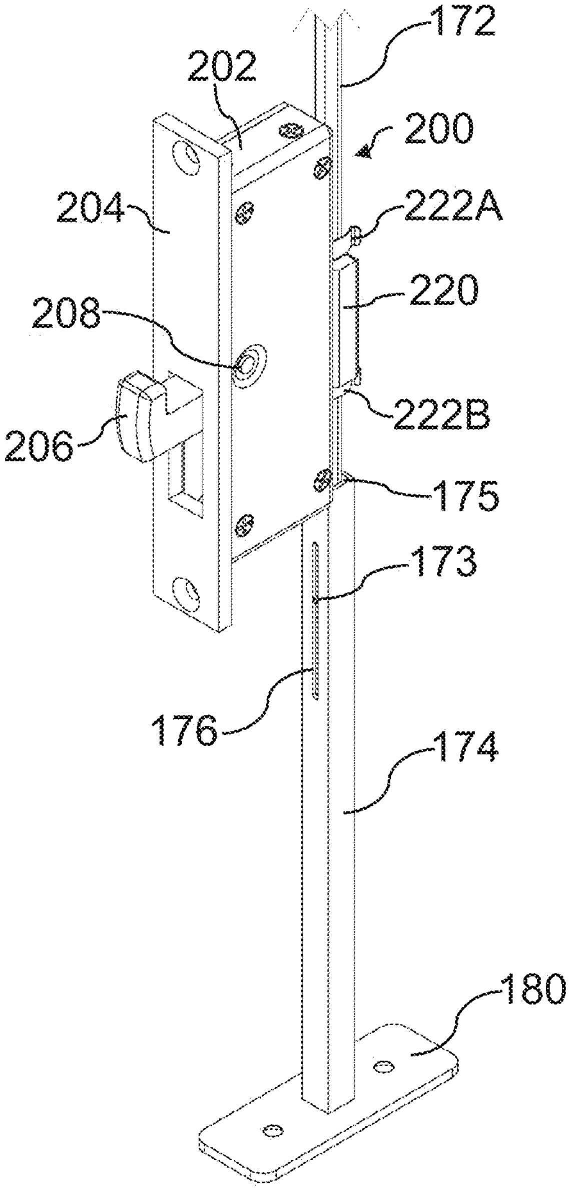
FIG. 12 is a perspective view of the side latch of FIG. 9 and one embodiment of a rod guide.

FIG. 12 is a perspective view of the side latch 200 of FIG. 9 and one embodiment of a rod guide 174. As shown in FIG. 12, the rod guide includes a rod channel 175, and rod guide slot 176, and a base 180. The base is configured to be mounted to the threshold portion of a door to secure the rod guide to the door. The rod channel 175 receives the second rod 172 and may be shaped and sized to limit the range of motions for the second rod. That is, the second rod may be closely fit or have a complementary shape with the rod channel so that the second rod is substantially constrained to linear motion along its longitudinal axis and alignment between the second rod and side latch is maintained. Additionally, the rod guide slot 176 is configured to receive a second rod pin 173 so that the motion of the second rod is further limited to motion along its longitudinal axis. Such an arrangement may promote reliable and consistent actuation of the side latch. Additionally, as shown in FIG. 12, the rod guide may extend from the bottom the door past to a position proximate the chassis 202 of the side latch. That is, the rod guide may be approximately equidistant from the bottom of a door relative to the bottom of the chassis of the side latch. Such an arrangement may provide substantial stability to the second rod without interference with the installation or operation of the side latch. Of course, the rod guide may have any suitable shape or extend any suitable distance from the bottom of the door to effectively guide the second rod, as the present disclosure is not so limited.

Figure 13:
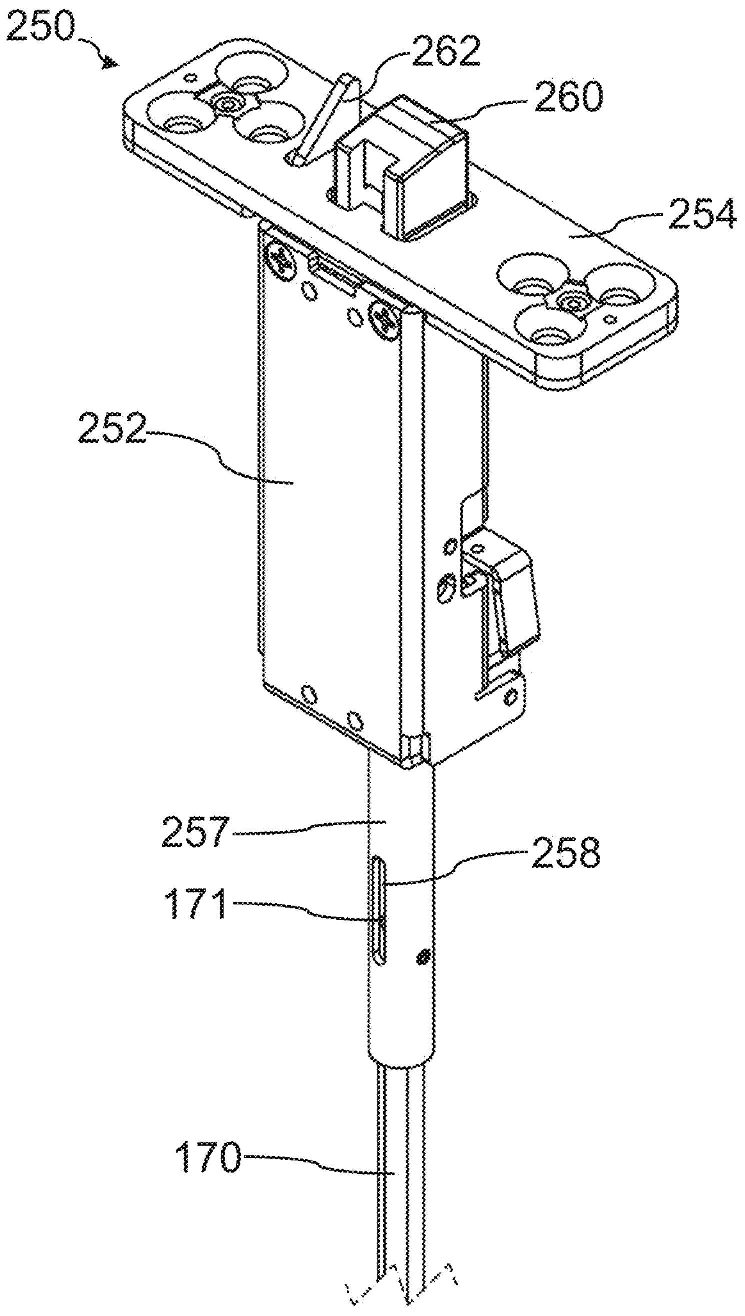
FIG. 13 is a perspective view of one embodiment of a transom latch for the exit device of FIG. 1.

FIG. 13 is a perspective view of one embodiment of a transom latch 250 for use in the exit device of FIG. 1. As discussed previously, the transom latch is configured to secure an associated door to a doorway transom. The transom latch includes a chassis 252 which is secured in the top of the door by transom face plate 254. The transom latch includes a latch head 260 and a trigger 262. The trigger 262 has an inclined face and is configured to automatically retract when the trigger strikes a transom strike plate, whereas the latch head 260 is not configured to automatically retract. Accordingly, the trigger may be employed to time the release of the latch head 260 so that the latch head does not interfere with a transom strike plate when opening or closing the door, as will be discussed further with reference to FIG. 14. As shown in FIG. 13, the chassis 252 of the transom latch includes a transom rod guide 257 which is configured to receive the first rod 170. The first rod guide includes a transom rod guide slot 258 configured to receive a first rod pin 171 which constrains the motion of the first rod to linear motion along its longitudinal axis and maintains alignment of the first rod with the transom latch. Accordingly, the first rod 170 may be used to reliably move the latch head 260 between engaged and disengaged positions with linear motion.

Figure 14:
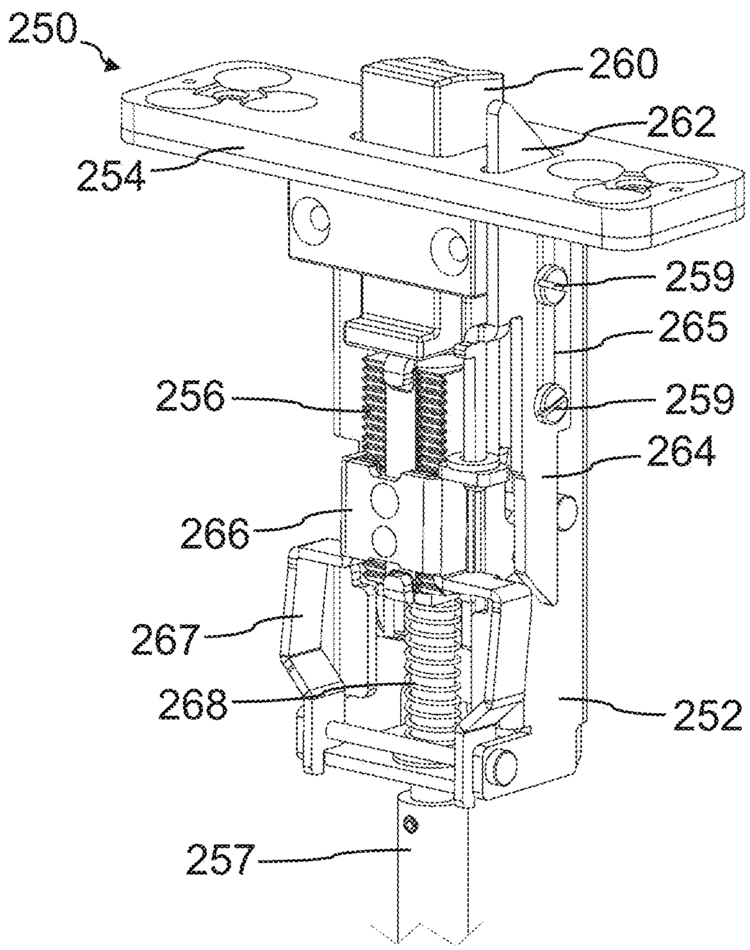
FIG. 14 is another perspective view of the transom latch of FIG. 13.

FIG. 14 is another perspective view of the transom latch 250 of FIG. 14 showing the lockout 266 and trigger 262 in detail. As best shown in FIG. 14, the trigger 262 is configured to slide on trigger supports 259 disposed in trigger slot 265. The trigger includes a lockout engagement portion 264 which is configured as a camming surface which moves the lockout when the trigger is moved from the extended position shown in FIG. 14 to a retracted position. The lockout 266 is disposed on a rotatable lockout arm 267 and is configured to engage a plurality of ratchet teeth 256. The lockout may be spring loaded so that the lockout positively engages the ratchet teeth in a resting position. The ratchet teeth are configured to allow the latch head 260 to move from the engaged position (e.g., extended position) shown in FIG. 14 to a disengaged position (e.g., a retracted position) but does not allow the opposite motion. Accordingly, when the latch head is retracted by activation of an associated actuator and tension applied through a first rod, the lockout progressively engages the ratchet teeth to maintain the latch head in the disengaged position. When the associated actuator is released (e.g., when the door is fully open), the latch head is kept in the disengaged position by the lockout against the urging of a biasing member 268 which urges the latch head toward the engaged position. When the door closes and the trigger is retraced by a transom strike plate, the lockout engagement portion (i.e., a first camming surface) engages the rotatable lockout arm (i.e., a second camming surface) to move the lockout up and away from the ratchet teeth. When the lockout clears the ratchet teeth, the latch head may automatically return to the engaged position under influence from the biasing member 268. The trigger 262 may be configured so that the lockout does not clear the ratchet teeth to release the latch head until the latch head is positioned over a transom latch head receptacle so that interference during extension is minimized or eliminated.

According to the embodiment shown in FIG. 14 and as discussed previously, the biasing member 268 may be used to bias the entirety of the exit device mechanism toward a secure position (i.e., where all associated latches are in engaged positions). Accordingly, the lockout 266 may also be used to control the motion of the entirely of the exit device, and, in particular, an associated side latch having a hook latch head (see FIGS. 8-9). That is, when the exit device is actuated and the latch head is moved to a disengaged position, a hook latch head of the side latch may also be moved to a hook disengaged position. When the lockout engages the ratchet teeth 256, it may hold both the latch head 260 and the hook latch head in the disengaged positions so that there is no interference opening and closing the door. When the trigger causes the lockout to clear the ratchet teeth, the latch head and the hook latch head may be released so that they may be moved to the engaged and hook engaged positions, respectively. The trigger may be configured to release the latch head and hook latch head once each of the latch heads is positioned over a corresponding receptacle so that interference between the latch heads and the doorway is reduced or eliminated.

Figure 15:
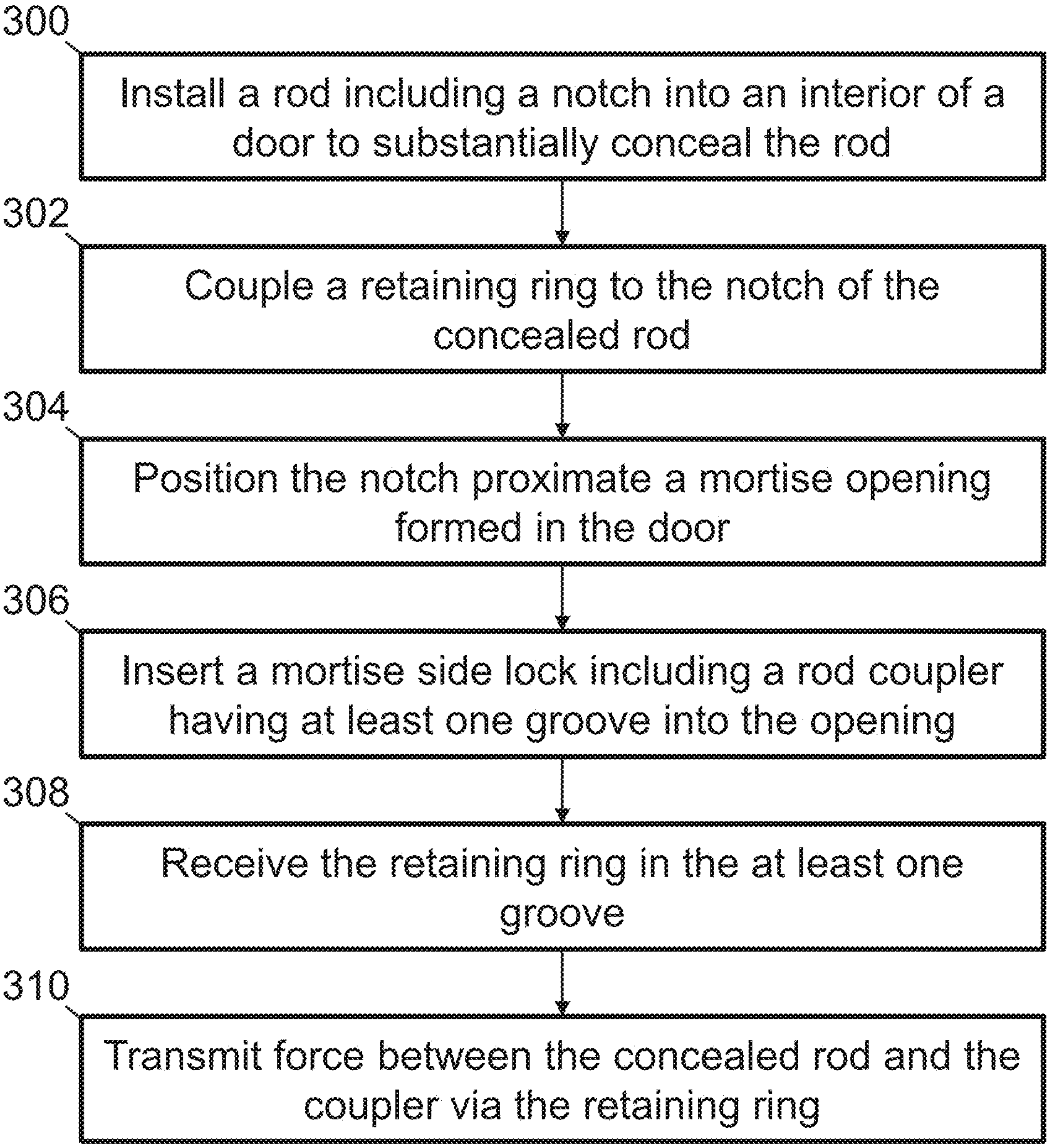
FIG. 15 is a block diagram of one embodiment for a method of installing an exit device according to exemplary embodiments described herein.

FIG. 15 is a block diagram of one embodiment for a method of installing an exit device according to exemplary embodiments described herein. In block 300, a concealed rod having a notch is installed in an interior of a door so that it is substantially concealed. In block 302, a retaining ring is coupled to the notch of the rod. In block 304, the notch is positioned proximate a mortise opening formed in the door. That is, the notch and retaining ring may be visible and/or accessible through the mortise opening. In some embodiments, the retaining ring may be provided with the rod, and the notch and retaining ring may be positioned proximate a mortise opening when the rod is installed into the door without further adjustment. In block 306, a mortise side latch including a rod coupler is inserted into the mortise opening, where the rod coupler includes at least one groove. In block 308, the retaining ring is received in the at least one groove. In some cases, the retaining ring may be received in the at least one groove as a result of one or more inclined lead-ins which guide the retaining ring towards the nearest of the at least one groove. In block 310, force is transmitted between the concealed rod and the coupler via the retaining ring disposed in the at least one groove. For example, the retaining ring may transmit linear force (e.g., compression or tension) which is applied along a longitudinal axis of the concealed rod.

Figure 16:
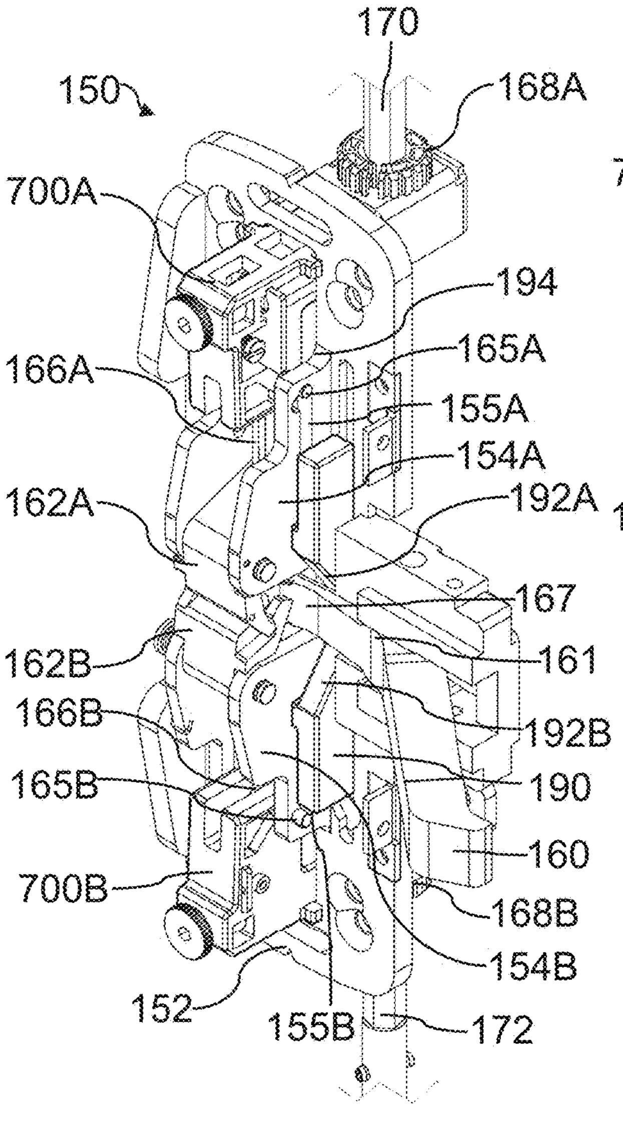
FIG. 16 is a perspective view of another embodiment of an actuator for a latching device.

FIG. 16 is a perspective view of one embodiment of an actuator 150 for a latching device (e.g., the exit device of FIG. 1). The actuator is configured to allow a first rod 170 and a second rod 172 to move concurrently along a first axis (corresponding to a longitudinal axis of the first rod) and a second axis (corresponding to a longitudinal axis of the second rod), respectively. As shown in FIG. 16, a lever 160 is rotatably mounted to a chassis 152 by a hinge portion 161. A cam engagement portion 167 of the lever engages both a first cam 162A and a second cam 162B. The first cam and second cam are rotatably mounted to a first guide wall 154A and a second guide wall 154B, respectively. Accordingly, when the lever is rotated about the hinge portion, the cam engagement portion 167 will engage both the first cam and second cam to rotate the cams in opposite directions about parallel axes. The first cam is coupled to a first rod holder 700A by a first linkage 166A which converts the rotational motion of the cam to linear motion of the first rod holder. The first rod holder and first linkage are at least partially disposed in a first linkage slot 155A formed in the first guide wall 154A which at least partially constrains to the first linkage and first rod holder to linear movement. Similarly, the second cam is coupled to a second rod holder 700B by a second linkage 166B which is disposed at least partially in second linkage slot 155B formed in the second guide wall. According to the embodiment shown in FIG. 16, when the lever is rotated about the hinge portion 161, the cams draw the first rod holder 700A and second rod holder 700B closer together, thereby applying tension through the rods to a transom latch and/or side latch. The rod holders of the actuator of FIG. 16 are configured to simplify assembly of a multi-point latching device by allowing free rotation of the rods 170, 172 and employ a non-threaded engagement between the rod holders and the rods. The specific arrangement of the first rod holder 700A and second rod holder 700B are discussed further below with reference to FIGS. 18-21.

As shown in FIG. 16, the actuator 150 also includes a slider 190 disposed in a slider slot 194 formed in the chassis 152 of the actuator. The slider includes a first inclined camming surface 192A and a second inclined camming surface 192B which are configured to selectively engage the lever 160 to rotate the lever. The slider 190 may be operatively coupled to an interior handle or other actuator so that the lever may be actuated from a side of the door from which the lever 160 is not accessible. When the slider engages the lever, the lever may be cammed to correspondingly rotate the first and second cams 162A, 162B to actuate an associated latch with the first rod 170 and second rod 172.

Figure 17:
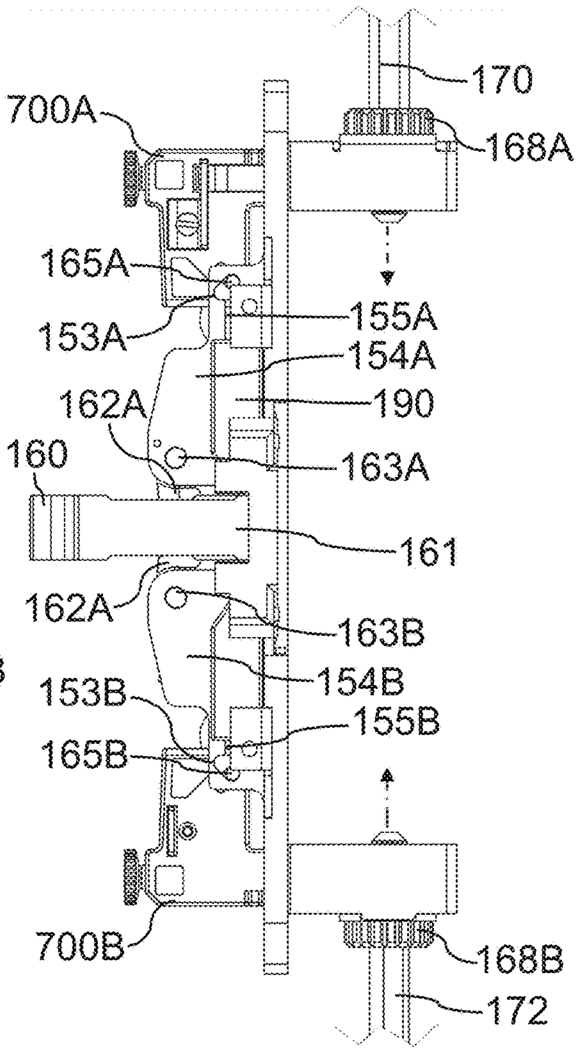
FIG. 17 is a right-side elevation view of the actuator of FIG. 16.

FIG. 17 is a right-side elevation view of the actuator 150 of FIG. 16. As shown in FIG. 17, the first rod 170 and the second rod 172 are moveable along their longitudinal axes by movement of the first rod holder 700A and second rod holder 700B, respectively. That is, the first rod holder 700A and second rod holder 700B also move along the longitudinal axes of the first rod and the second rod. The first rod holder is constrained at least partially to linear movement by first linkage pin 165A which is disposed in the first linkage slot 155A and couples the first rod holder to the first linkage (see FIG. 16). Likewise, the second rod holder is constrained at least partially to linear movement by second linkage pin 165B which is disposed in second linkage slot 155B and couples the second rod holder to the second linkage (see FIG. 16). In some embodiments as shown in FIG. 17, the first and second rods have coincident axes (i.e., the longitudinal axes of both rods are coincident). Accordingly, in some embodiments, when the lever 160 is actuated the first and second rods are moved toward or apart from one another along the same coincident axis. Of course, in other embodiments the longitudinal axes of the rods may not be coincident, as the present disclosure is not so limited. As shown in FIG. 17, the first cam 162A is rotatably coupled to the first guide wall 154A by first cam pin 163A and the second cam 162B is rotatably coupled to the second guide wall 154B by a second cam pin 163B. In the depicted embodiment, the first cam and second cam are configured to rotate equally in opposite directions about their respective axes when engaged by the lever 160. When the cams rotate in opposite directions, the first and second rods will move further apart along their coincident axes. According to the embodiment of FIG. 17, rotation of the lever by a user may move the first and second rods closer together along their coincident axes, applying tension through the rods to move any associated latch toward a disengaged position.

According to the embodiment shown in FIG. 17, the actuator includes first and second deadlatching catches 153A, 153B formed as a part of the first linkage slot 155A and second linkage slot 155B. The deadlatching catches are configured to prevent movement of the first rod holder 700A or second rod holder 700B without direct actuation of the lever 160. That is, force applied directly to the first or second rods may cause the first linkage pin 165A and second linkage pin 165B to engage and abut against first deadlatching catch 153A and second deadlatching catch 153B, respectively. Thus, force which is externally applied to the exit device (e.g., to a transom latch head or a hook latch head) may not move the rods to release the door. If the actuator is properly actuated, rotation of the first cam 162A and the second cam 162B may draw the first pin and second pin out of the deadlatching catches and into the first linkage slot 155A and second linkage slot 155B. The direction of rotation of the first cam and the second cam may be suitable to draw the pin out of the deadlatching catch to allow the first rod holder and second rod holder to move toward one another to release the door upon direct actuation of the lever 160.

Figure 18:
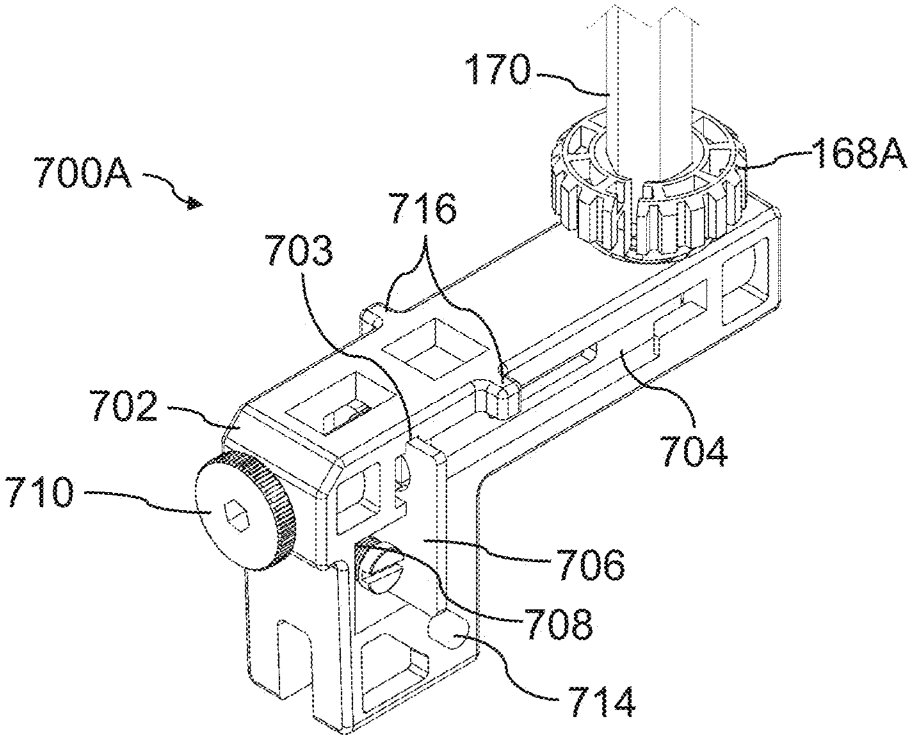
FIG. 18 is a perspective view of an embodiment of a rod coupler.
Figure 19:
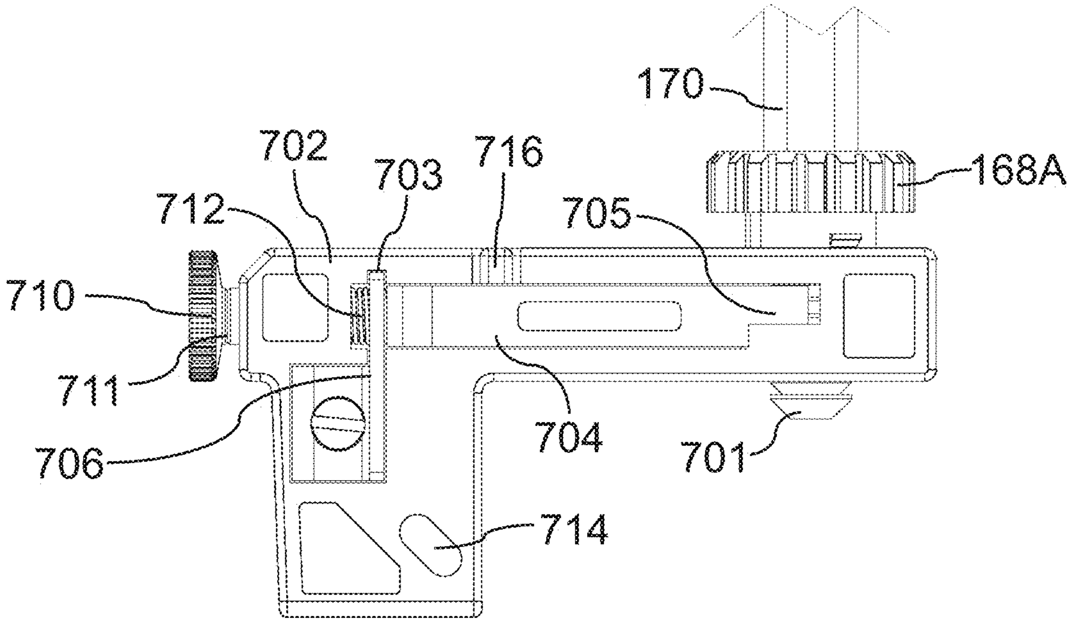
FIG. 19 is a right-side elevation view of the rod coupler of FIG. 18.

FIG. 18 is a perspective view and FIG. 19 is a right-side view of an embodiment of a rod holder 700A. According to the embodiment of FIG. 18, the rod holder 700A is configured to provide an interface between an actuator of a latching device concealed rod. In particular, the rod coupler is configured to reliably transmit longitudinal force between a rod 170 and the actuator. The rod coupler of FIGS. 18-19 is configured to simplify adjustment of a rod actuated latch when the rod is disposed in a door. As shown in FIGS. 18-19, the rod holder includes a rod holder chassis 702. The rod holder chassis is configured to support the various components of the rod holder and transmit force between the rod and the actuator. According to the embodiment of FIGS. 18-19, the rod holder chassis 702 includes a slot 714 configured to receive and secure a linkage pin from an associated actuator, as discussed above with reference to FIGS. 16-17. The rod holder chassis 702 also includes a pair of guides 716 configured to abut and slide along a chassis of an associated actuator. In some embodiments, the rod holder chassis 702 is configured to slide along a rod holder slot formed in an actuator chassis. As shown in FIGS. 18-19, the rod holder chassis 702 is configured to receive a rod 170. Additionally, in some embodiments as shown in FIGS. 18-19, the rod holder chassis is configured to support an adjustment nut 168A that allows rotation of the rod 170 about a longitudinal axis of the rod. In some embodiments, a tool such as a screwdriver may be employed by a user to rotate the rod 170 from outside of the door.

According to the embodiment of FIGS. 18-19, the rod holder 700A includes a pawl 704, a lockout 706, and a handle 710. Together, the pawl, lockout, and handle are configured to be manipulated by a user to selectively secure the rod 170 to the rod holder chassis 702.

As shown in FIGS. 18-19, the pawl 704 is configured to slide inside of the rod holder chassis between an engaged position and a disengaged position. In some embodiments as shown in FIGS. 18-19, the pawl is configured to slide in a direction perpendicular to a longitudinal axis of the rod 170. The pawl includes an engagement portion 705 that is configured to engaged ratchet teeth 701 formed on the rod 170 when the pawl is in the engaged position. The engagement portion may include one or more projections, teeth, textures, or other features configured to engage the ratchet teeth 701 of the rod. The rod 170 may include any suitable number of ratchet teeth configured to engage the engagement portion of the pawl. Of course, while ratchet teeth may be employed in some embodiments, in other embodiments any suitable features may be employed on a rod, including, but not limited to, notches, symmetrical teeth, or knurling. In some embodiments as shown in FIG. 19, the rod holder may include a pawl spring 712 (e.g., a compression spring) that biases the pawl toward the engaged position.

According to the embodiment of FIGS. 18-19, the lockout 706 is configured to lock the pawl 704 in either the engaged position or the disengaged position. In some embodiments, the lockout 706 is slidable between a locking position and an unlocking position. In the locking position, the lockout is configured to lock the pawl into the engaged position or disengaged position. In some embodiments, the lockout 706 is configured to slide in a direction transverse to the direction the pawl slides. In particular, in some embodiments as shown in FIGS. 18-19, the lockout 706 is configured to slide in a direction perpendicular to a direction in which the pawl slides. In some embodiments as shown in FIG. 18, the rod holder may include a lockout spring 708 (e.g., a compression spring) configured to bias the lockout toward the locking position. According to the embodiment of FIG. 18, the rod holder chassis includes a lockout slot 703 configured to constrain the movement of the lockout to slide along an axis defined by the lockout slot.

According to the embodiment of FIGS. 18-19, the handle 710 is coupled to the pawl and is operable by a user to move the pawl 704 between the engaged position and disengaged position. In some embodiments as shown in FIG. 19, the handle 710 may include a threaded portion 711 configured to thread into the rod holder chassis 702. According to the depicted embodiment, threading the threaded portion 711 into the chassis may move the pawl into the engaged position. Additional specific functionality and motion of the pawl 704, lockout 706, and handle 710 will be discussed further with reference to FIGS. 20-21.

Figure 20:
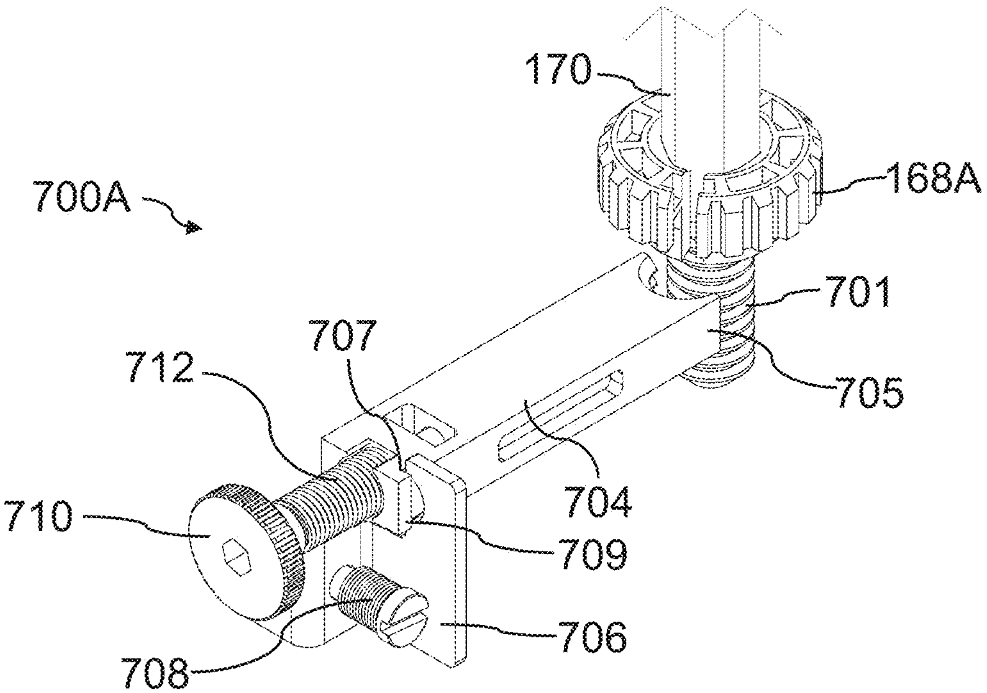
FIG. 20 is a perspective view of the rod coupler of FIG. 18 with a rod holder chassis removed in a first state.
Figure 21:
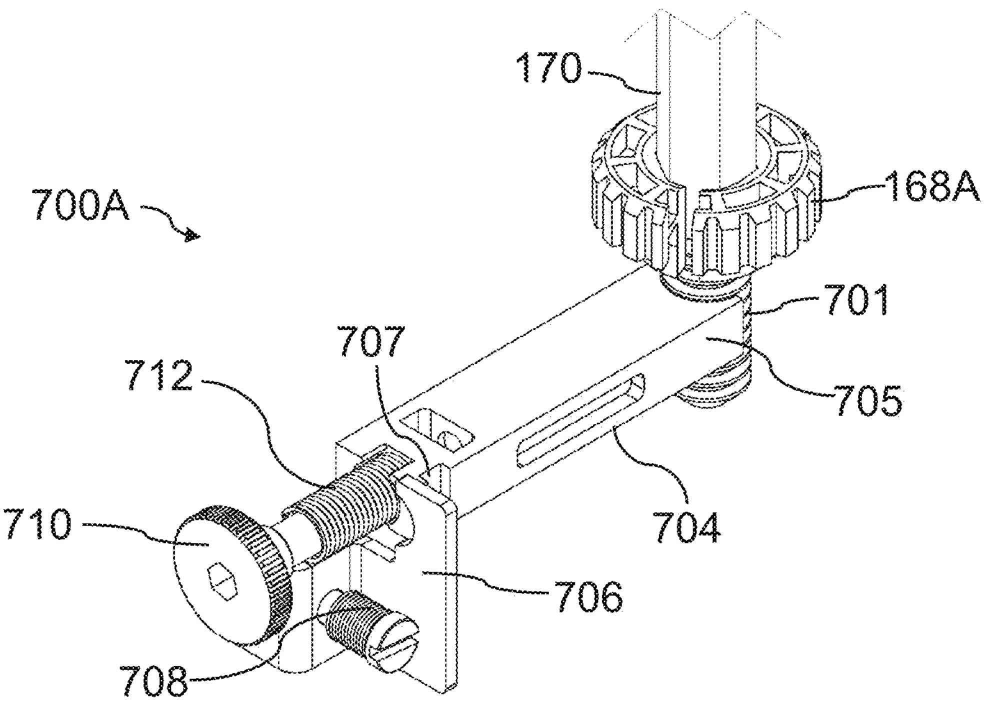
FIG. 21 is a perspective view of the rod coupler of FIG. 20 in a second state.

FIG. 20 is a perspective view of the rod holder 700A of FIG. 18 with a rod holder chassis removed in a first state. In the state of FIG. 20, the pawl 704 is in a disengaged position. That is, in the disengaged position the engagement portion 705 of the pawl 704 is not engaged with the ratchet teeth 701 of the rod 170. Accordingly, the rod 170 is able to move freely relative to the rod holder when the pawl is in the disengaged position. In some embodiments, the rod may be rotated by the adjustment nut 168A to thread or unthread the rod from an associated bottom or transom latch to move the latch along its longitudinal axis. In such embodiments, the rotation of the rod 170 via the adjustment nut may be used to adjust the effective length of the rod between the rod holder and an associated transom or bottom latch. As shown in FIG. 20, the pawl includes a notch 707 that is configured to receive the lockout 706. As discussed previously with reference to FIGS. 18-19, the lockout 706 is configured to move between a locking position and an unlocking position. In the state of FIG. 20, the lockout is in the locking position and is engaged with the notch 707 of the pawl 704. Accordingly, the lockout inhibits movement of the pawl toward an engaged position (e.g., toward the rod 170). Of course, while a notch is shown in FIG. 21, in other embodiments any suitable engagement between the lockout and the pawl may be employed. For example, in some embodiments, the pawl may include a projection configured to engage the lockout 706 such that the pawl is maintained in the disengaged position. In some embodiments as shown in FIG. 20, the pawl slides in a first direction toward and away from the rod 170, whereas the lockout slides in a second direction perpendicular to the first direction.

In some embodiments as shown in FIG. 20, the rod holder 700A includes a lockout spring 708 configured to bias the lockout toward the locking position. In some embodiments, the lockout spring 708 is a compression spring configured to apply a force to the lockout to urge the lockout toward the locking position. In some embodiments as shown in FIG. 20, the rod holder 700A also includes a pawl spring 712 configured to bias the pawl toward the engaged position. Accordingly, the lockout 706 is configured to resist the force of the pawl spring 712 when the lockout is engaged with the notch 707 (e.g., when the pawl is in the disengaged position and the lockout is in the locking position). If course, while compression springs are employed in the embodiment of FIG. 20, in other embodiments any suitable type of spring may be employed, including, but not limited to, tension springs or torsion springs, as the present disclosure is not so limited.

According to the state shown in FIG. 20, a user may move the lockout 706 from the locking position to an unlocking position. Moving the lockout to the unlocking position frees the pawl 704 to move toward the engaged position into contact with the rod 170. In particular, the pawl 704 is able to move automatically toward the engaged position under the force from the pawl spring 712. In some embodiments, the automatic movement of the pawl toward the rod 170 may not move the pawl fully into the engaged position. In some such embodiments, the handle 710 may be manipulated by a user to move the pawl fully into the engaged position where the engagement portion is fully engaged with the ratchet teeth 701. In some embodiments, the handle 710 may include a threaded portion configured to be threaded into a rod holder chassis to move the pawl fully into the engaged position. In some embodiments, the pawl 704 may be configured to maintain the lockout 706 in the unlocking position when the pawl is between the engaged position and the disengaged position. For example, in the embodiment of FIG. 20, the pawl includes a surface 709 that is configured to abut the lockout and inhibit the lockout from moving toward the locking position when the pawl is not in the engaged position or disengaged position. In some cases, if the pawl 704 is in a partially engaged position and the lockout remains the lockout position, the rod holder may still be employed to transmit force between an actuator and the rod 170. In some other embodiments, the pawl spring 712 may move the pawl fully into the engaged position when the lockout 706 is moved to the unlocking position.

FIG. 21 is a perspective view of the rod holder 700A of FIG. 20 in a second state. In the second state of FIG. 21, the pawl 704 is in the engaged position. Accordingly, the engagement portion 705 is engaged with the ratchet teeth 701 such that longitudinal force may be transmitted between the rod 170 and the rod holder 700A. With the pawl in the engaged position, the lockout 706 is able to move into the locking position under the force from the lockout spring 708. In some embodiments as shown in FIG. 21, the lockout 706 may be configured to move into a path of the pawl 704 when pawl is in the engaged position. That is, the lockout 706 abuts an end of the pawl 704 such that the pawl is not able to move away from the rod 170 (e.g., toward the disengaged position). In this manner, the lockout locks the pawl in the engaged position, maintaining a secure connection between the pawl and the rod 170. Once the lockout 706 is in the locking position with the pawl in the engaged position, the pawl may be held in the engaged position independent of the spring force from the pawl spring 712 or any securement via the handle 710 (e.g., by a threaded portion of the handle threaded into a rod holder chassis). Of course, while in the embodiment of FIG. 21 the lockout is configured to move into a path of the pawl 704 and abut an end of the pawl, other arrangements are contemplated. For example, in some embodiments, the pawl may include a second notch corresponding to the engaged position which the lockout may engage. As another example, in some embodiments the pawl may include a projection configured to be engaged by the lockout. Accordingly, any suitable arrangement to secure the pawl in the engaged position with the lockout may be employed, as the present disclosure is not so limited.

It should be noted that while in the embodiments of FIGS. 18-21 the rod holder was disposed below the rod, the rod holder may be used in any desired orientation, as the present disclosure is not so limited. That is, the rod holder may be employed for an upper rod or a lower rod in a latching device, as the present disclosure is not so limited in this regard.

Figure 22:
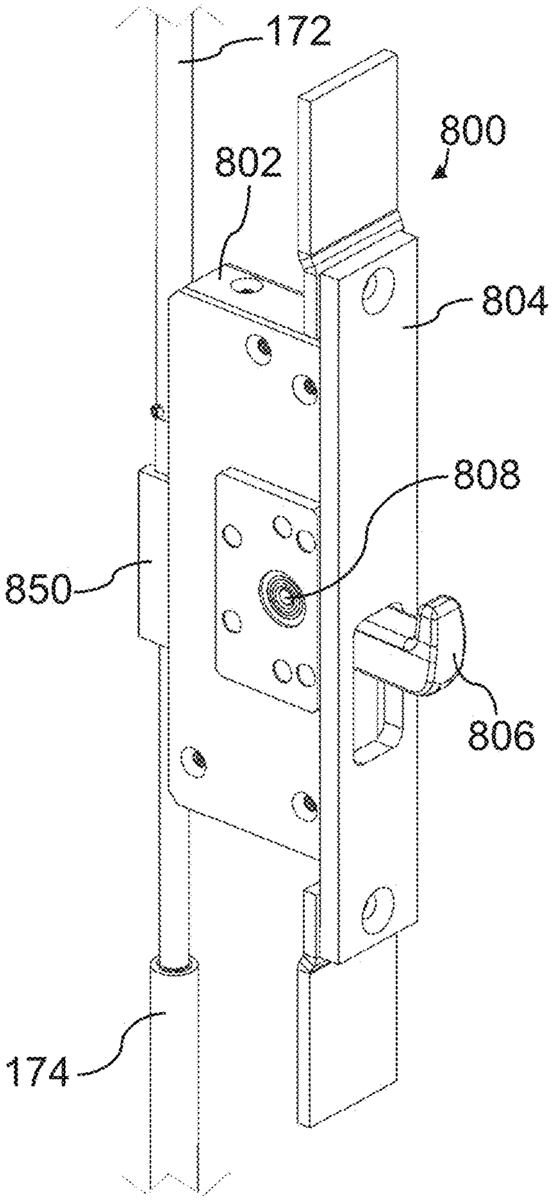
FIG. 22 is a perspective view of one embodiment of a side latch for latching device.

FIG. 22 is a perspective view of one embodiment of a side latch 800 (e.g., a rod actuated mortise latch) for an exit device or other latching device. As shown in FIG. 22, the side latch includes a chassis 802 and a face plate 804. The chassis 202 is configured to be received in a mortise opening in a door, where the side latch is configured to be secured to the door with the face plate 804. As shown in FIG. 22, the side latch 800 includes a latch head 806 configured to move between an engaged position and a disengaged position. In some embodiments as shown in FIG. 22, the latch head includes a hook. The latch head is configured to rotate about a latch head pin 808 between the engaged position and disengaged position. In some embodiments as shown in FIG. 22, the latch head moves at least partially in a direction perpendicular to a longitudinal axis of an associated rod. The latch head 806 is configured to engage an associated door frame (e.g., a door jamb). As shown in FIG. 22, the side latch also includes a rod coupler 850 configured to provide an interface between the side latch and a rod 172 (e.g., a lower rod). The functionality of the rod coupler 850 is discussed further below with reference to FIGS. 23-25. As shown in FIG. 22, the rod 172 is disposed partially in a rod guide 174 which is configured to contain the rod to movement along a longitudinal axis of the rod.

Figure 23:
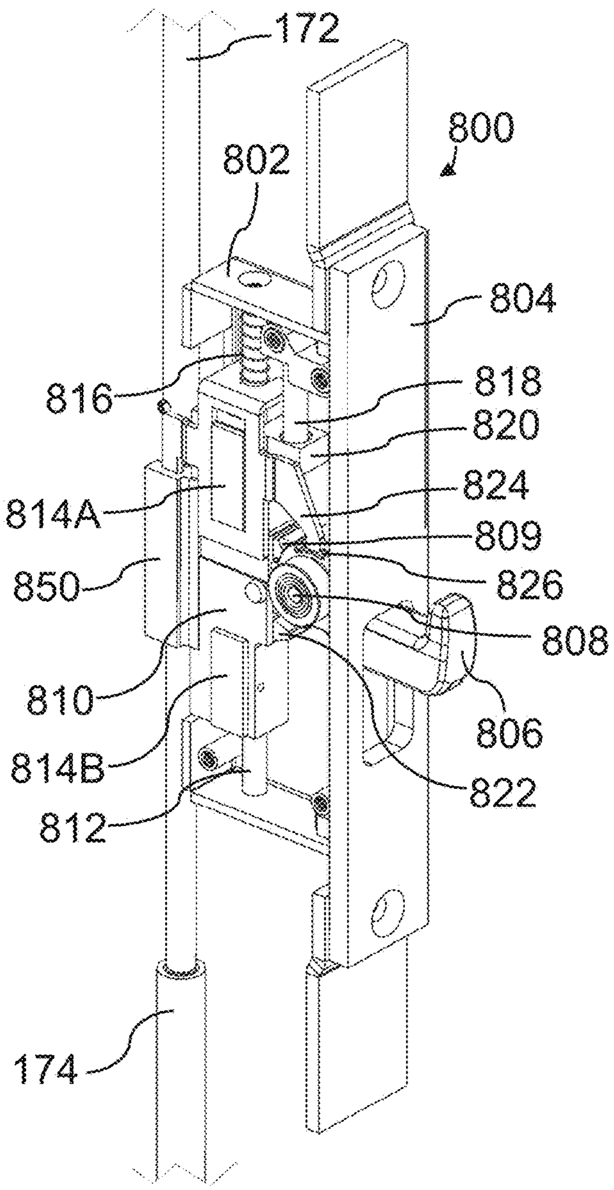
FIG. 23 is a perspective view of the side latch of FIG. 22 with a cover removed.

FIG. 23 is a perspective view of the side latch 800 of FIG. 22 with a cover removed to show the internal components of the side latch. As discussed above with reference to FIG. 22, the latch head 806 is configured to rotate between an engaged position and a disengaged position about the latch head pin 808. According to the embodiment of FIG. 23, the side latch is configured to convert longitudinal movement of the rod 172 into rotational movement of the latch head. To accomplish this, in some embodiments the latch head includes a pinion gear 809 configured to engage a rack 822 formed on the rod coupler 850. As shown in FIG. 23, the rod coupler includes a slide body 810 the rod coupler includes a slide body 810 which includes the rack 822. As shown in FIG. 23, the slide body 810 is disposed on a guide rail 812 so that the slide body is constrained to move in a linear direction along the guide rail parallel to the longitudinal axis of the rod 172. In particular, the guide rail is secured in a guide channel of the slide body with a first clip 814A and a second clip 814B which secure the slide body to the guide rail but allow the slide body to move with the second rod. Accordingly, linear movement of the rod 172 is converted into rotational movement of the latch head 806 which may be used to move the hook latch head between the hook engaged and hook disengaged positions. In some embodiments as shown in FIG. 23, the side latch may include a second guide rail 818 which may be received in a second channel 820. The second guide rail may further constrain the slide body 810 to move parallel to the rod 172. Of course, any suitable number of guide rails may be employed, as the present disclosure is not so limited.

In some embodiments as shown in FIG. 23, the side latch may include a deadlatching slide 824. The deadlatching slide 824 is configured to inhibit the rotation of the hook latch by an external application of force (e.g., to inhibit unauthorized operation of the side latch). The deadlatching slide is configured to move between a deadlatching position and a free position. As shown in FIG. 23, the deadlatching slide is received in a recess 826 formed in the latch head when the deadlatching slide is in the deadlatching position. Accordingly, the deadlatching slide blocks rotation of the latch head 806 from the engaged position to the disengaged position. To move the deadlatching slide to the free position, the slide body 810 may be moved upward by the rod 172. Accordingly, normal operation of the side latch with the rod 172 is not interfered with by the deadlatching slide, as the motion of the rod may move the deadlatching slide to the free position and rotate the latch head to the disengaged position. In some embodiments as shown in FIG. 23, the deadlatching slide may be constrained to move along the guide rail 812 in a direction parallel to the rod 172, though any direction of movement may be employed. In some embodiments, a side latch includes a deadlatching spring 816 configured to bias the deadlatching slide to the deadlatching position. According to such an embodiment, the deadlatching slide may automatically engaged the recess 826 when the latch head is moved to the engaged position.

Figure 24:
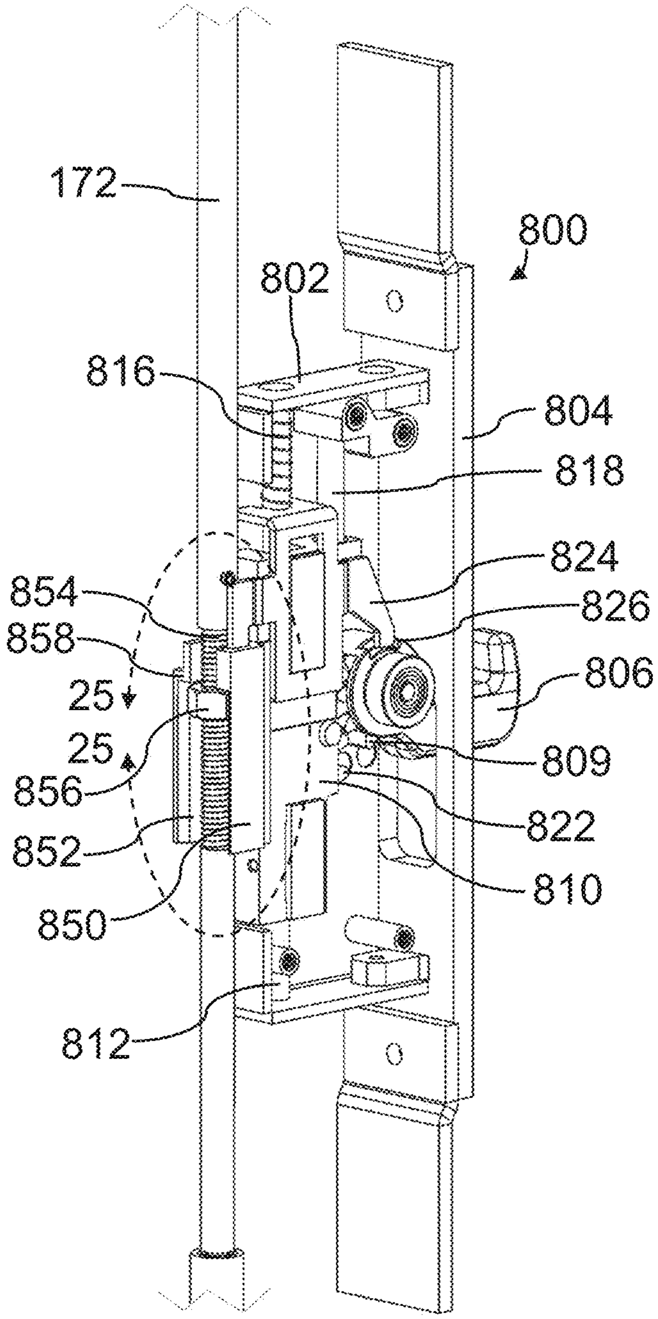
FIG. 24 is another perspective view of the side latch of FIG. 22 with a cover removed.

FIG. 24 is another perspective view of the side latch 800 of FIG. 22 with a cover removed showing the interface between the rod coupler 850 and the rod 172. As shown in FIG. 24, the rod includes a threaded portion 854 with a nut 856 threaded thereon. The rod coupler 850 includes a channel 852 that receives the threaded portion and the nut. The channel is configured such that the nut is not able to rotate relative to the channel when the nut is disposed in the channel. In some embodiments as shown in FIG. 24, the channel may include two flats configured to engage faces of the nut 856 so that torque may be transmitted between the channel and the nut. In this manner, the flats may block the nut from rotating relative to the channel. While two flats are employed in the embodiment of FIG. 24, any suitable number of flats may be employed to engage the nut, including, but not limited to, one flat, two flats, three flats, four flats, and five flats. In some embodiments, other engagement surfaces other than flats may be employed, as the present disclosure is not so limited. In some such embodiments, the nut and channel may include correspondingly shaped surfaces configured to transmit torque therebetween. As shown in FIG. 24, the rod coupler also includes a stop 858 disposed along the channel. The stop is configured to abut the nut 856 so that longitudinal force may be transmitted between the rod 172 and the rod coupler 850. The rod may be rotated (e.g., at an adjustment nut of a rod holder) to move the nut 856 along the threaded portion 854. Accordingly, during installation the nut may be moved into engagement with the stop 858. Due to the threaded portion 854, the nut has a near infinite number of positions along the threaded portion, so that the side latch may be adjusted to the specific dimensions of a door and latching device during installation.

Figure 25:
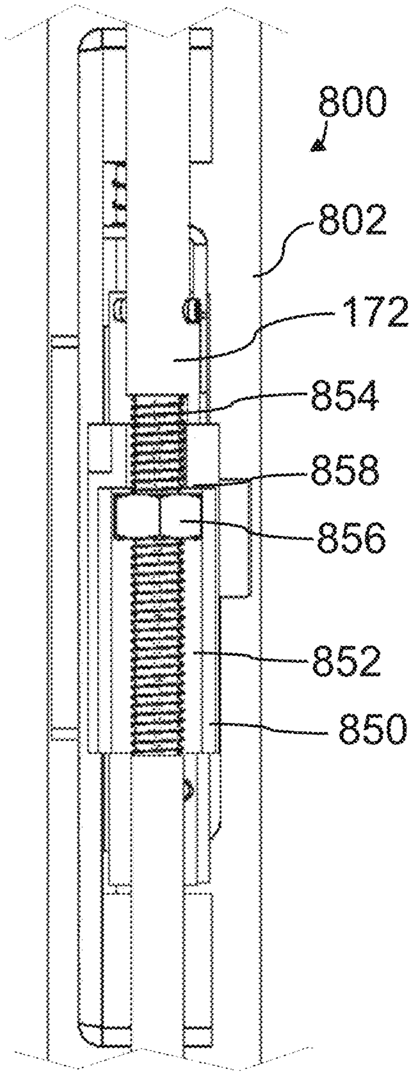
FIG. 25 is an enlarged elevation view of section 25 of FIG. 24.

FIG. 25 is an enlarged elevation view of section 25 of the side latch 800 of FIG. 24 showing the threaded portion 854, nut 856, and channel 852. As shown in FIG. 25, the threaded portion 854 is aligned with the channel 852 such that the nut 856 may be received in the channel. Flats of the channel engage the nut 856 to inhibit relative rotation of the nut relative to the channel. The rod 172 may be rotated to move the nut along the threaded portion of the rod. During installation of the side latch 800, the rod 172 may be rotated until the nut is brought into engagement with the stop 858. With the nut in engagement with the stop, tension may be transmitted via the rod to the rod coupler 850, which may in turn move the rod coupler. As the rod coupler moves, the latch head of the side latch (see FIG. 24) may be moved from an engaged position to a disengaged position. In the embodiment of FIG. 25, the nut 856 is a hexagonal nut. Of course, in other embodiments, any suitable shape of nut may be employed, including four sided, five sided, or eight sided nuts, as the present disclosure is not so limited.

Figure 26:
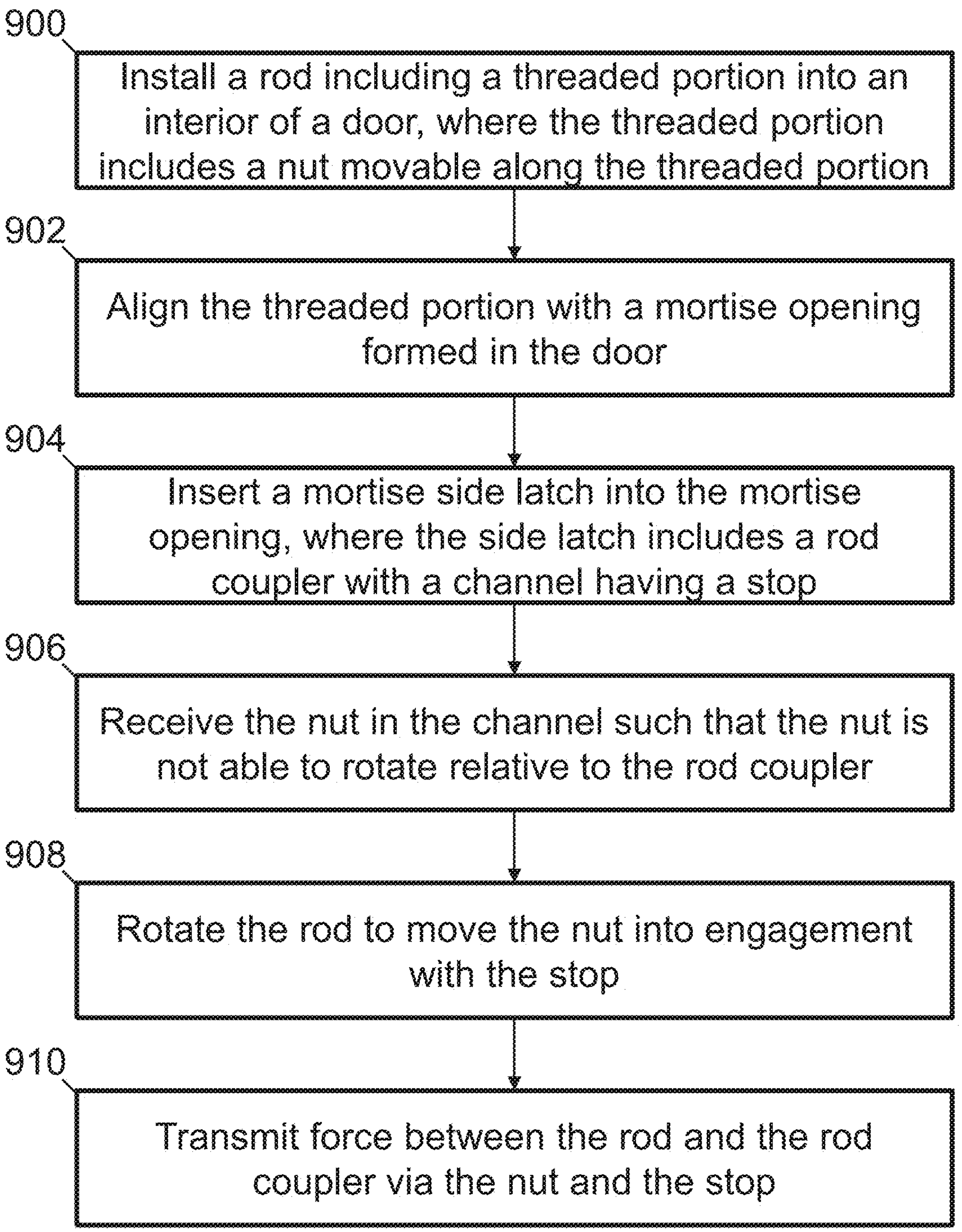
FIG. 26 is a block diagram of one embodiment for a method of installing a rod actuated mortise latch according to exemplary embodiments described herein.

FIG. 26 is a block diagram of one embodiment for a method of installing a rod actuated mortise latch according to exemplary embodiments described herein. In block 900, a rod including a threaded position is installed in an interior of a door, where the threaded portion includes a nut movable along the threaded portion. In block 902, the threaded portion is aligned with a mortise opening formed in the door. For example, in some embodiments the position of the rod in a rod holder may be adjusted to position the threaded portion adjacent the mortise opening. In block 904, the mortise side latch is inserted into the mortise opening. The side latch includes a rod coupler having a channel with a stop. In block 906, the nut is received in the channel such that the nut is not able to rotate relative to the rod coupler. For example, in some embodiments, at least two flats may engage at least two faces of the nut to inhibit rotation the nut in the channel. In block 908, the rod is rotated to move the nut into engagement with the stop. Rotation of the rod moves the nut along the threaded portion of the rod. In some embodiments, moving the nut into engagement with the stop includes moving the nut into engagement with a stop positioned above the nut. In block 910, force is transmitted between the rod and the rod coupler via the nut and the stop. In some embodiments, this force transmission may move a latch head from an engaged position to a disengaged position. The force may be a tension force transmitted from an actuator through the rod and to the rod coupler.

Figure 27:
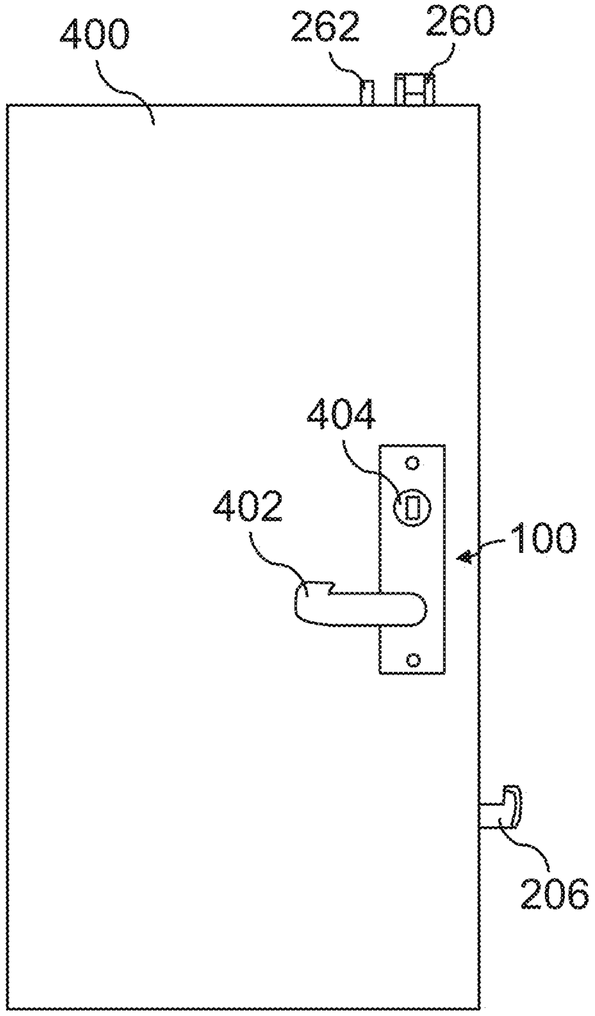
FIG. 27 is a front elevation view of one embodiment of a door including an exit device according to exemplary embodiments described herein.

FIG. 27 is a front elevation view of one embodiment of a door 400 including an exit device 100 according to exemplary embodiments described herein. As shown in FIG. 27, the door includes an exit device 100 having a transom latch head 260, a trigger 262, and a hook latch head 206 which projects from a side of the door. According to the state shown in FIG. 4, the exit device is in the secured position with the transom latch head 260 in an engaged position and the hook latch head 206 in a hook engaged position which would secure the door to an associated door frame transom and door jamb, respectively. As discussed previously, the trigger 262 may be configured to allow the transom latch head and the hook latch head to extend automatically when the door is closes without significant interference with the door frame. As shown in FIG. 27, the door also includes a handle 402 and a keyhole 404. The handle may be coupled to a handle attachment of an actuator of the exit device, so that the handle may be turned to move the transom latch head and hook latch head toward a disengaged position and hook disengaged position, respectively. The keyhole may be operated with the use of a corresponding key which may be used to selectively allow use of the handle (i.e., lock or unlock the handle of the door). Of course, any suitable locking device and user interface for interacting with the exit device may be employed in a door, as the present disclosure is not so limited.

Figure 28:
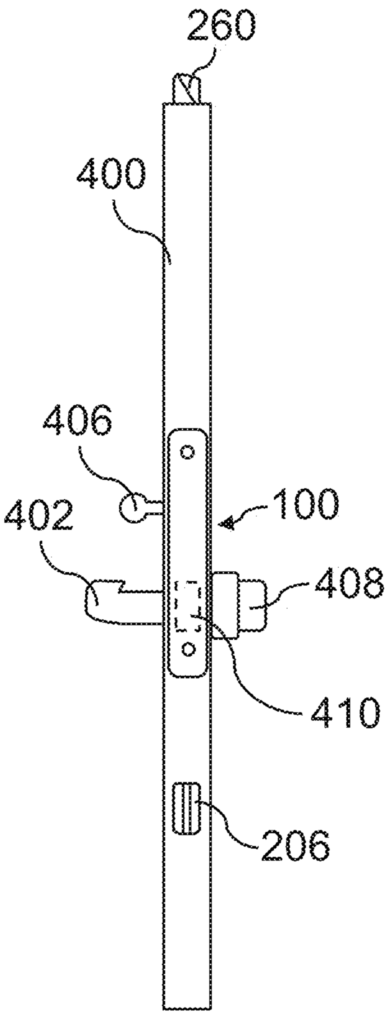
FIG. 28 is a side elevation view of the door of FIG. 27.

FIG. 28 is a side elevation view of the door 400 of FIG. 27. As shown in FIG. 27, the side of the door opposite that of the handle 402 includes a push bar 408 which may be used to actuate a lever of the exit device 100. That is, a user may push on the push bar 408 to rotate the lever to move the hook latch head 206 and transom latch head 260 toward a disengaged position and hook disengaged position, respectively, to release the door. In some embodiments, the push bar may be positioned on an interior side of the door which swings outward for efficient egress of an interior space. Of course, while a push bar is shown in FIG. 28, any suitable user interface device which allows a user to actuate the exit device may be employed, as the present disclosure is not so limited. According to the embodiment shown in FIG. 28 and discussed previously, a key 406 may be used to selectively allow actuation of the exit device with the handle 402. Such an arrangement may be beneficial to lock an exterior side of the door on which the handle may be disposed. In some embodiments, the exit device may include an optional third latch head 410 disposed near the handle 402 and push bar 408 which is moved between an engaged position and disengaged position in conjunction with the transom latch head 260 and hook latch head 206. Of course, any suitable number of latch heads or bolts may be employed in the exit device to secure the door to an associated door frame, as the present disclosure is not so limited.

Figure 29:
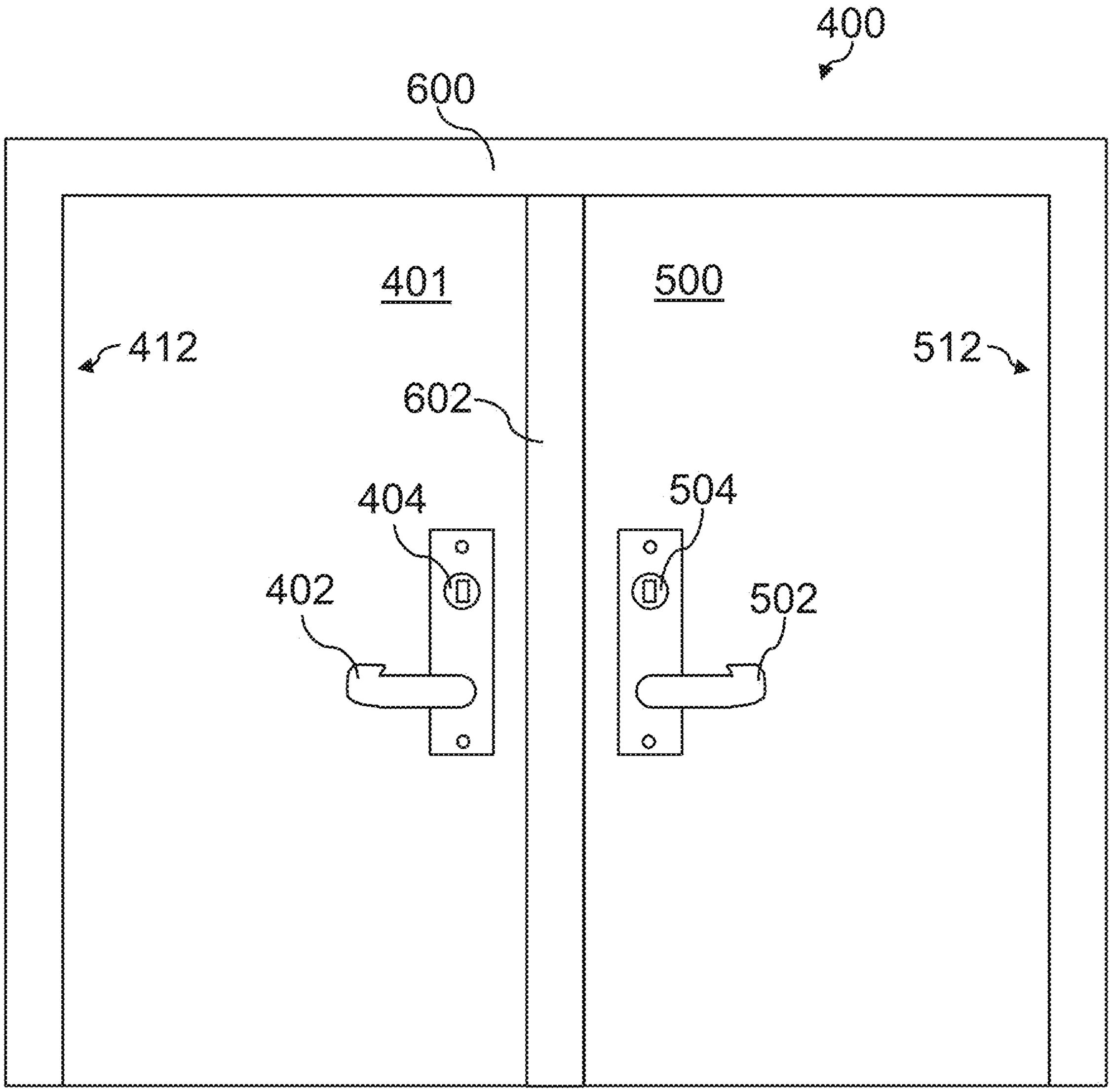
FIG. 29 is a front elevation view of another embodiment of a door and a door frame.

FIG. 29 depicts one embodiment of a door 400 including a first door panel 401, a second door panel 500, and a door frame 600 having a mullion 602. The first door panel is mounted to the door frame at a first hinge interface 412 and the second door panel is mounted to the door frame at a second hinge interface 512. As shown in FIG. 29, a first handle 402 is mounted to the first door panel and is configured to operate an exit device attached to the door. The exit device may include a transom latch and a side latch, similar to the embodiment shown in FIGS. 27-28. Additionally, a keyhole 404 may be used to selectively secure the first handle 402. According to the embodiment of FIG. 29, the exit device attached to the first door panel includes a side latch which engages the mullion 602. The mullion may be secured to the door frame transom and an underlying floor so that the secured door may withstand impacts or other forces. According to the embodiment shown in FIG. 29, the second door panel also accommodates an attached exit device which is operable with a second handle 502. Additionally, a second keyhole 504 may be used in conjunction with a key to selectively secure the second handle. The exit device attached to the second door panel may be similar to that attached to the first door panel. In some embodiments, an exit device attached to the second door panel may not include a central actuator, and may instead include a transom bolt, mullion bolt, or bottom bolt which may be manually moved to secure the door. Of course, the second door panel may have any suitable exit device, latch head, bolt, or lock so that the door may be selectively secure to the door frame, mullion, or underlying floor, as the present disclosure is not so limited.

In some embodiments, doors secured with exit devices according to exemplary embodiments described herein may be suitable for use in high wind areas. For example, a door secured by the exit device of FIG. 1 may withstand a first impact from a 6.8 kg 2×4 piece of lumber traveling at a speed between 80 mph and 100 mph near the transom latch. The same secured door may then subsequently withstand a subsequent second impact from a 6.8 kg 2×4 piece of lumber traveling at a speed between 80 mph and 100 mph near the actuator. Finally, the same secured door may subsequently withstand a subsequent third impact from 6.8 kg 2×4 piece of lumber traveling at a speed between 80 mph and 100 mph near a hinge interface of the door. In cases where a pair of doors is employed and at least one is secured with an exit device according to exemplary embodiments disclosed herein, the secured door may withstand a subsequent fourth impact from a 6.8 kg 2×4 piece of lumber traveling at a speed between 80 mph and 100 mph near a mullion interface between the two doors. Additionally, a door secured by an exit device of exemplary embodiments described herein may withstand positive or negative pressure as a result of wind speeds between 130 and 250 mph. Withstanding the above noted impacts or pressures may be determined at least partially by measuring perforation of a witness screen placed proximate the door. That is, a door withstands impact or pressure when a #70 unbleached kraft paper witness screen with its surface secured in place on a rigid frame installed within 5 inches of the interior surface of the door remains unperforated after the impact or pressure. Furthermore, a door may withstand impact or pressure when permanent deformation of the door measured from a straight edge held between two undeformed points on the door is less than or equal to 3 inches. Of course, doors secured by the exit devices of embodiments described herein may meet any suitable standards for use in high wind areas, storm shelters, etc., including, but not limited to ICC 500, FEMA P361, FEMA P320, or any other modern or updated testing standard, as the present disclosure is not so limited.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A rod holder for a latching device, comprising:

a rod holder chassis configured to receive a rod;

a pawl slidably disposed in the rod holder chassis, wherein the pawl is configured to move between an engaged position and a disengaged position, wherein the pawl is configured to engage a ratchet tooth of the rod;

a handle coupled to the pawl and configured to move the pawl between the engaged position and the disengaged position; and a lockout slidably disposed in the rod holder chassis, wherein the lockout is configured to move between a locking position and an unlocking position, wherein the lockout is configured to lock the pawl in the engaged position or the disengaged position when the lockout is in the locking position, and wherein the lockout is configured to move into a path of the pawl when the lockout moves toward the locking position.

2. The rod holder of claim 1, further comprising a pawl spring, wherein the pawl spring is configured to bias the pawl toward the engaged position.

3. The rod holder of claim 1, wherein the handle includes a threaded portion configured to thread into the rod holder chassis to secure the pawl in the engaged position.

4. The rod holder of claim 1, further comprising an adjustment nut configured to rotate the rod received in the rod holder chassis.

5. The rod holder of claim 1, wherein the pawl includes a notch configured to receive the lockout when the pawl is in the disengaged position and the lockout is in the locking position.

6. The rod holder of claim 1, further comprising a lockout spring, wherein the lockout spring is configured to bias the lockout toward the locking position.

7. The rod holder of claim 6, wherein the pawl is configured to maintain the lockout in the unlocking position when the pawl is between the engaged position and the disengaged position.

8. The rod holder of claim 7, wherein the lockout is configured to automatically move to the locking position by force from the lockout spring when the pawl is in the engaged position or the disengaged position.

9. The rod holder of claim 1, wherein the pawl is configured to slide in a first direction, wherein the lockout is configured to slide in a second direction, wherein the first direction and the second direction are transverse to one another.

10. The rod holder of claim 9, wherein the first direction and the second direction are perpendicular to one another.

11. The rod holder of claim 1, wherein the rod holder chassis includes a slot configured to receive a linkage pin of an actuator.

12. The rod holder of claim 11, further comprising the actuator, wherein the actuator comprises:

an actuator chassis;

a lever rotatably mounted to the actuator chassis by a hinge portion and including a cam engagement portion; and a first cam coupled to the rod holder via the linkage pin, wherein the rod holder is slidably disposed in the actuator chassis which allows movement of the rod holder along a first axis;

wherein the cam engagement portion engages the first cam when the lever is rotated about the hinge portion by a user to move the rod holder in a first direction along the first axis.

13. The rod holder of claim 12, wherein the rod holder chassis includes at least one guide configured to abut and slide against the actuator chassis.

14. A rod actuated mortise latch comprising:

a chassis configured to be secured to a door; and a rod coupler comprising:

a channel configured to receive an associated rod of a latching device including a threaded portion and a nut, wherein the channel is configured to inhibit rotation of the nut relative to the channel;

a stop configured to engage the nut by rotating the associated rod until the nut is moved into engagement with the stop;

a latch head configured to move between an engaged position and a disengaged position, wherein when the rod coupler moves along a longitudinal axis of the associated rod, the latch head moves between the engaged position and the disengaged position; and a deadlatching slide configured to move between a deadlatching position and a free position, wherein the deadlatching slide is configured to engage a catch of the latch head in the deadlatching position when the latch head is in the engaged position, wherein the engagement between the stop and the nut is configured to allow transmission of longitudinal force between the associated rod and the rod coupler, wherein the stop is configured to be moved by the nut.

15. The rod actuated mortise latch of claim 14, wherein the latch head moves at least partially in a direction perpendicular to the longitudinal axis of the associated rod.

16. The rod actuated mortise latch of claim 14, wherein the latch head is a hook latch head which rotates between the engaged position and the disengaged position.

17. The rod actuated mortise latch of claim 14, wherein the latch head is configured to rotate between the engaged position and the disengaged position.

18. The rod actuated mortise latch of claim 17, wherein the rod coupler further comprises a rack, and wherein the latch head includes a pinion engaged with the rack.

19. The rod actuated mortise latch of claim 14, further comprising a deadlatching spring configured to bias the deadlatching slide to the deadlatching position.

20. The rod actuated mortise latch of claim 14, wherein movement of the rod coupler along the longitudinal axis of the associated rod is configured to move the deadlatching slide from the deadlatching position to the free position.

21. The rod actuated mortise latch of claim 14, wherein the channel is configured to allow movement of the nut along the longitudinal axis of the associated rod when the associated rod rotates relative to the channel.

22. A method of installing a rod actuated mortise latch, the method comprising:

inserting a rod into a door, wherein the rod includes a threaded portion including a nut;

aligning the threaded portion with a mortise opening formed in the door;

inserting a mortise latch having a chassis and a rod coupler into the mortise opening;

receiving the nut in a channel of the rod coupler, wherein the channel secures the nut and inhibits rotation of the nut relative to the channel;

rotating the rod to move the nut along the channel until the nut is moved into engagement with a stop of the rod coupler;

transmitting force between the rod and the rod coupler with the nut, wherein transmitting force between the rod and the rod coupler with the nut moves the stop with the nut;

moving a latch head between an engaged position and a disengaged position when the rod coupler moves along a longitudinal axis of the rod; and moving a deadlatching slide between a deadlatching position and a free position, wherein the deadlatching slide engages a catch of the latch head in the deadlatching position when the latch head is in the engaged position.

23. The method of claim 22, wherein receiving the nut in the channel of the rod coupler includes engaging at least two faces of the nut with at least two flats formed by the channel.

24. The method of claim 22, wherein transmitting force between the rod and the rod coupler with the nut moves the latch head of the mortise latch between the engaged position and the disengaged position.

25. The rod actuated mortise latch of claim 14, wherein the rod extends entirely through the channel.

26. The method of claim 22, wherein the rod extends entirely through the channel.

27. A rod holder for a latching device, comprising:

a rod holder chassis configured to receive a rod;

a pawl slidably disposed in the rod holder chassis, wherein the pawl is configured to move between an engaged position and a disengaged position, wherein the pawl is configured to engage a ratchet tooth of the rod;

a handle coupled to the pawl and configured to move the pawl between the engaged position and the disengaged position;

a lockout slidably disposed in the rod holder chassis, wherein the lockout is configured to move between a locking position and an unlocking position, and wherein the lockout is configured to lock the pawl in the engaged position or the disengaged position when the lockout is in the locking position; and a lockout spring configured to bias the lockout toward the locking position.

28. The rod holder of claim 27, wherein the pawl is configured to maintain the lockout in the unlocking position when the pawl is between the engaged position and the disengaged position.

29. The rod holder of claim 28, wherein the lockout is configured to automatically move to the locking position by force from the lockout spring when the pawl is in the engaged position or the disengaged position.

30. The rod holder of claim 27, wherein the pawl includes a notch configured to receive the lockout when the pawl is in the disengaged position and the lockout is in the locking position.

* * * * *